(12) United States Patent
Vetrovec

(10) Patent No.: US 9,702,594 B2
(45) Date of Patent: Jul. 11, 2017

(54) MAGNETOCALORIC REFRIGERATOR

(75) Inventor: Jan Vetrovec, Larkspur, CO (US)

(73) Assignee: AIP MANAGEMENT, LLC, Larkspur, CO (US)

( * ) Notice: Subject to any disclaimer, the term of this patent is extended or adjusted under 35 U.S.C. 154(b) by 421 days.

(21) Appl. No.: 13/134,390

(22) Filed: Jun. 6, 2011

(65) Prior Publication Data

US 2012/0060512 A1 Mar. 15, 2012

Related U.S. Application Data

(60) Provisional application No. 61/397,246, filed on Jun. 7, 2010, provisional application No. 61/397,175, filed on Jun. 7, 2010.

(51) Int. Cl.
 *F25B 21/00* (2006.01)
(52) U.S. Cl.
 CPC ...... *F25B 21/00* (2013.01); *F25B 2321/0021* (2013.01); *Y02B 30/66* (2013.01)
(58) Field of Classification Search
 CPC ..... F16L 55/1003; F16L 55/103; E21B 34/08; Y10T 134/2191; Y10T 137/2191; Y10T 137/0391; Y10T 137/1189; Y10T 137/2224; Y10T 137/218; F25B 21/00; F25B 2321/0021; Y02B 30/66
 USPC .............. 62/3.1, 3.7, 114, 335, 324.2, 467
 See application file for complete search history.

(56) References Cited

U.S. PATENT DOCUMENTS

| | | | | |
|---|---|---|---|---|
| 4,916,907 A * | 4/1990 | Munk et al. | | 62/3.1 |
| 5,024,059 A * | 6/1991 | Noble | | 62/3.1 |
| 5,040,373 A * | 8/1991 | Minovitch | | 62/51.1 |
| 5,091,361 A * | 2/1992 | Hed | | 505/163 |
| 5,182,914 A * | 2/1993 | Barclay et al. | | 62/3.1 |
| 6,595,004 B1 * | 7/2003 | Ghoshal | | 62/3.1 |
| 6,668,560 B2 * | 12/2003 | Zimm et al. | | 62/3.1 |
| 6,739,137 B2 * | 5/2004 | Minovitch | | 62/3.1 |
| 6,826,915 B2 * | 12/2004 | Wada et al. | | 62/3.1 |
| 6,935,121 B2 * | 8/2005 | Fang et al. | | 62/3.1 |
| 7,481,064 B2 * | 1/2009 | Kitanovski et al. | | 62/3.1 |

(Continued)

OTHER PUBLICATIONS

A. Kitanovski, P.W. Egolf, "Thermodynamics of Magnetic Refrigeration," in International Journal of Refrigeration, vol. 29 pp. 3-21 published in 2006 by Elsevier Ltd.

*Primary Examiner* — Mohammad M Ali

(57) ABSTRACT

The invention is for an apparatus and method for a refrigerator and a heat pump based on the magnetocaloric effect (MCE) offering a simpler, lighter, robust, more compact, environmentally compatible, and energy efficient alternative to traditional vapor-compression devices. The subject magnetocaloric apparatus alternately exposes a suitable magnetocaloric material to strong and weak magnetic field while switching heat to and from the material by a mechanical commutator using a thin layer of suitable thermal interface fluid to enhance heat transfer. The invention may be practiced with multiple magnetocaloric stages to attain large differences in temperature. Key applications include thermal management of electronics, as well as industrial and home refrigeration, heating, and air conditioning. The invention offers a simpler, lighter, compact, and robust apparatus compared to magnetocaloric devices of prior art. Furthermore, the invention may be run in reverse as a thermodynamic engine, receiving low-level heat and producing mechanical energy.

11 Claims, 21 Drawing Sheets

(56) References Cited

U.S. PATENT DOCUMENTS

| | | | |
|---|---|---|---|
| 7,536,866 B2 * | 5/2009 | Kobayashi et al. | 62/3.1 |
| 7,644,588 B2 * | 1/2010 | Shin et al. | 62/3.1 |
| 7,650,756 B2 * | 1/2010 | Muller et al. | 62/3.1 |
| 8,037,692 B2 * | 10/2011 | Muller et al. | 62/3.1 |
| 8,138,873 B2 * | 3/2012 | Zhang et al. | 335/296 |
| 8,191,375 B2 * | 6/2012 | Sari et al. | 62/3.1 |
| 8,209,988 B2 * | 7/2012 | Zhang et al. | 62/3.1 |

* cited by examiner

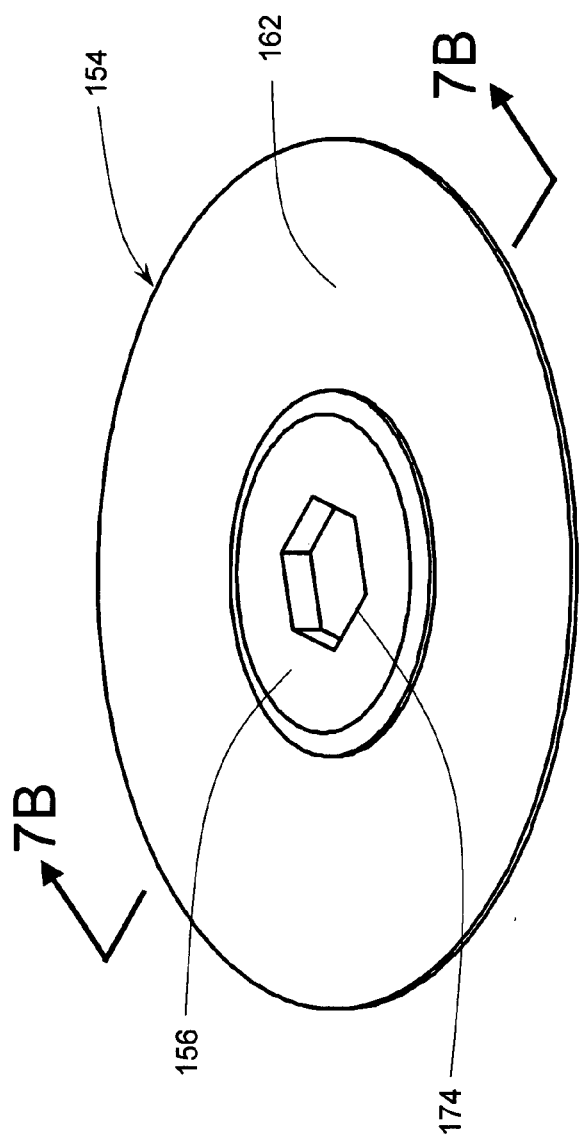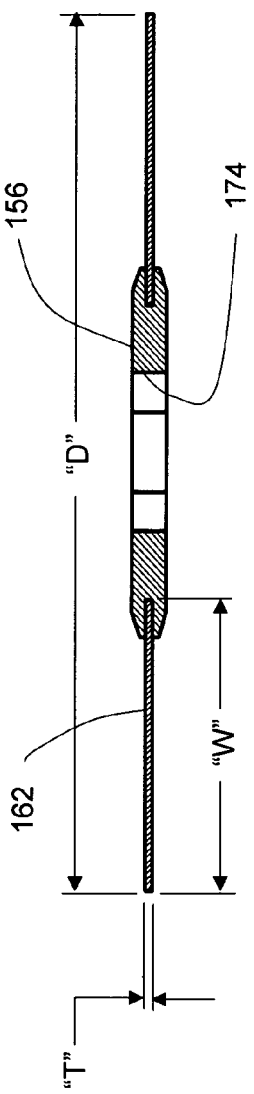

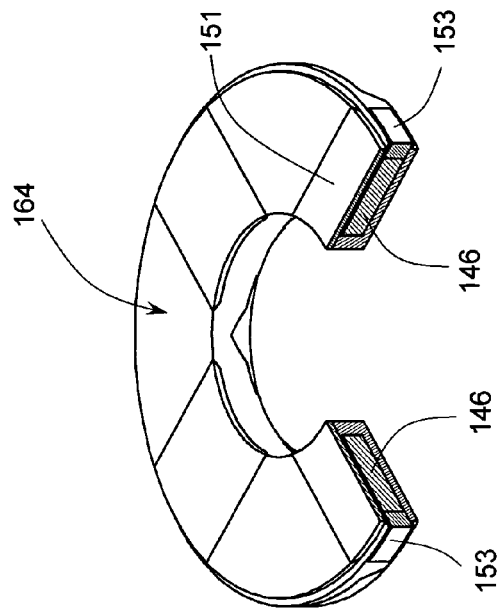
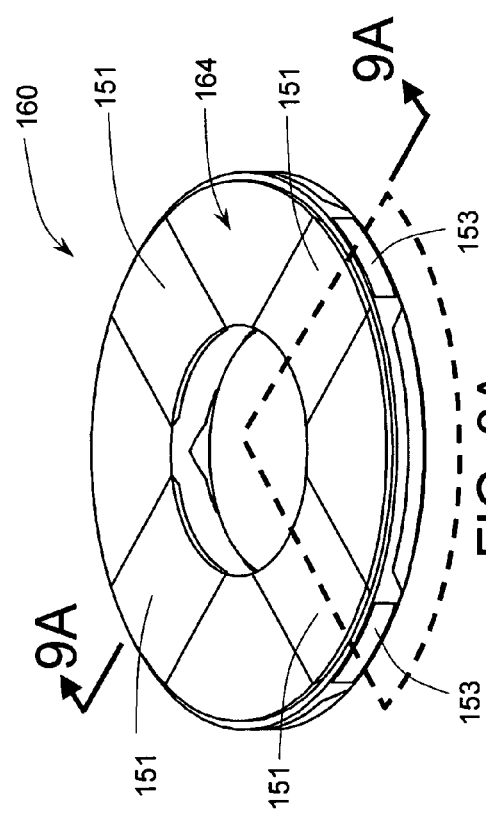
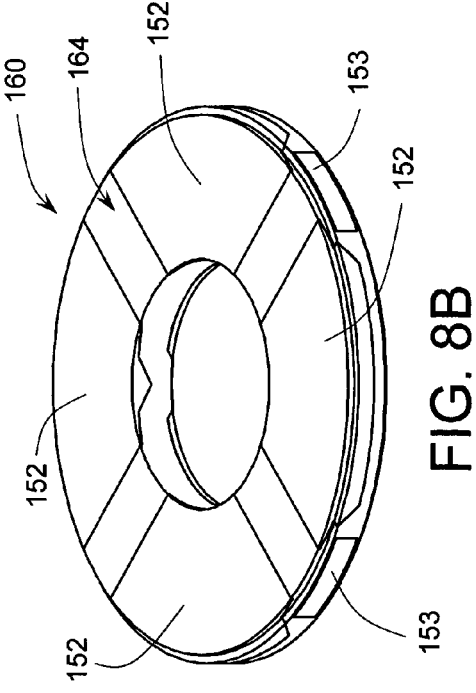
FIG. 8C
FIG. 8A
FIG. 8B

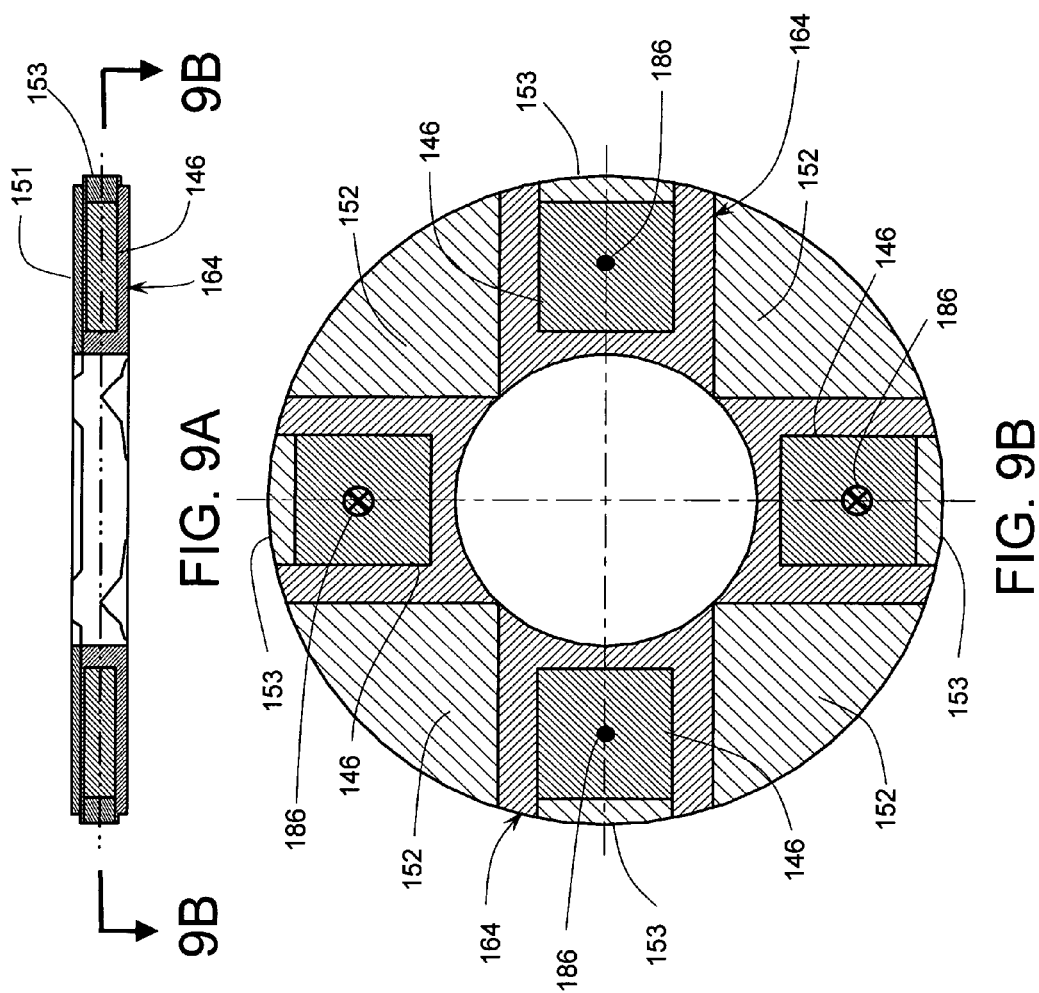

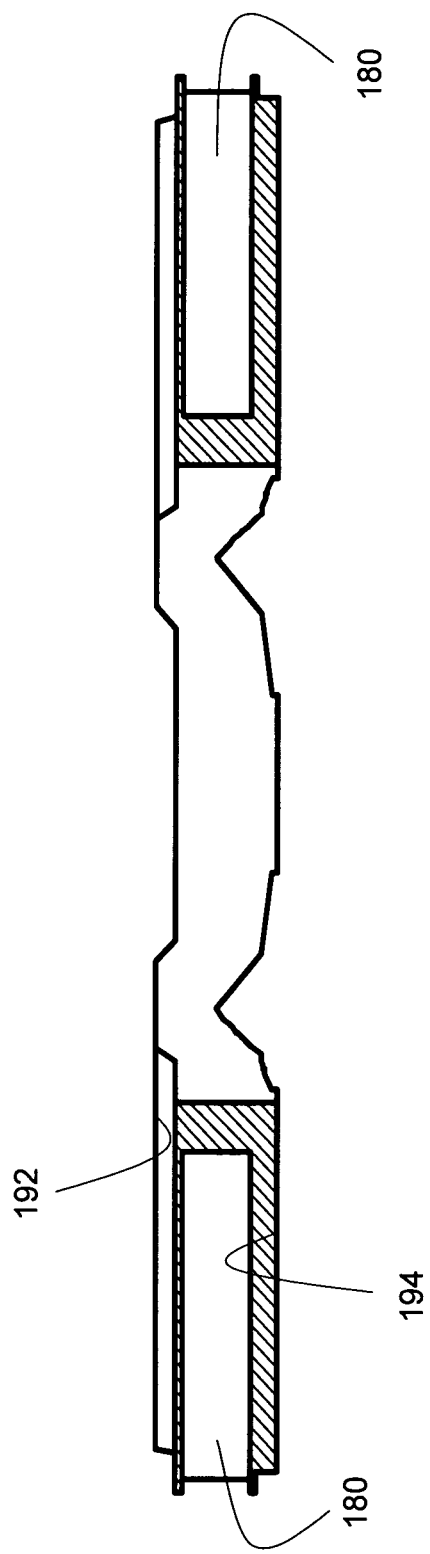

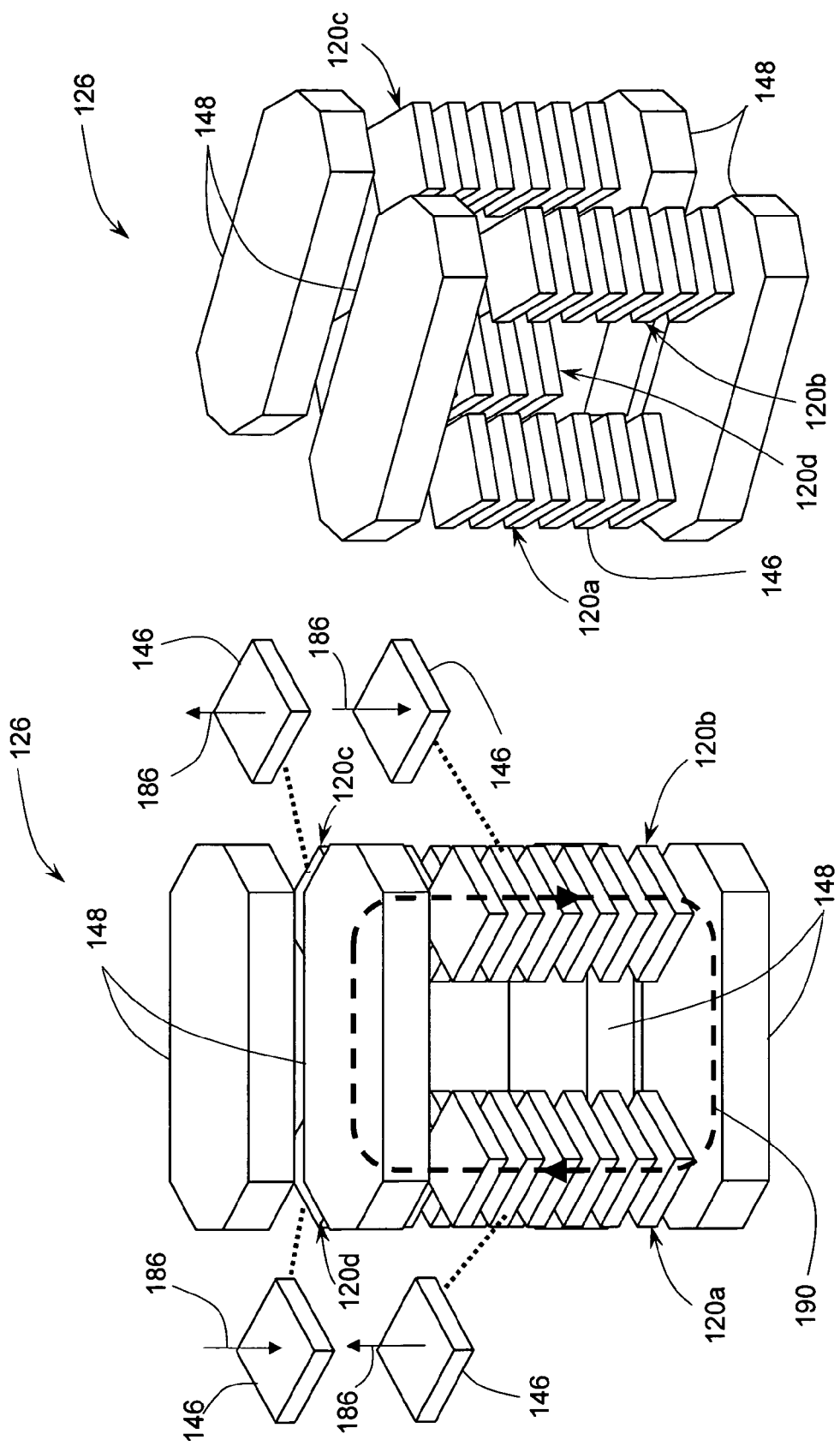

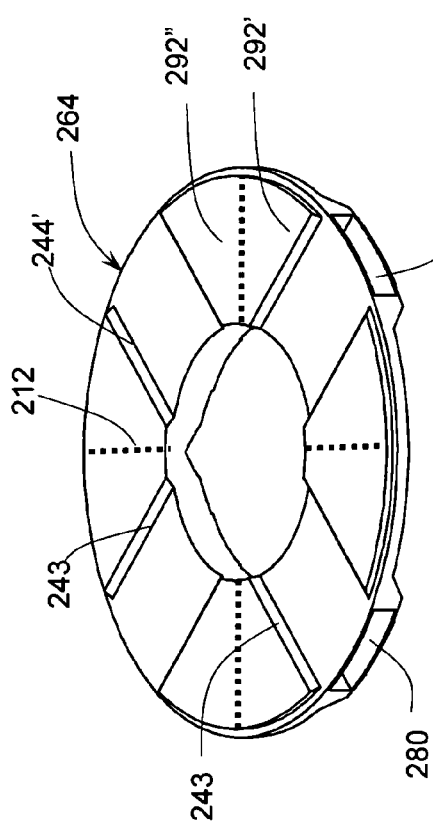
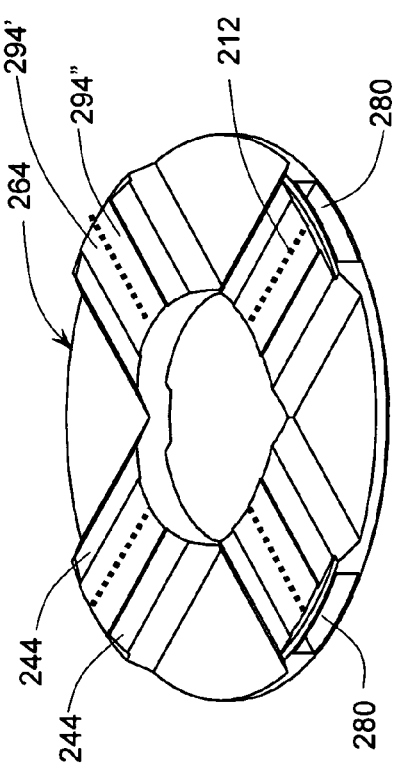
FIG. 19A
FIG. 19B

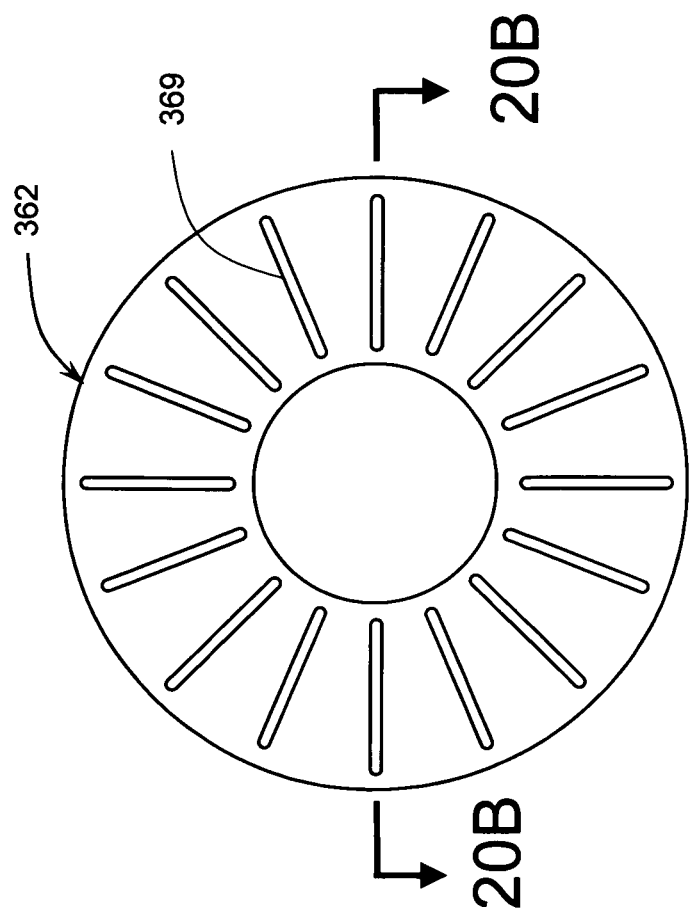
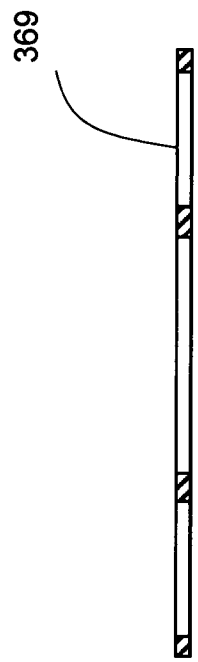
FIG. 20A
FIG. 20B

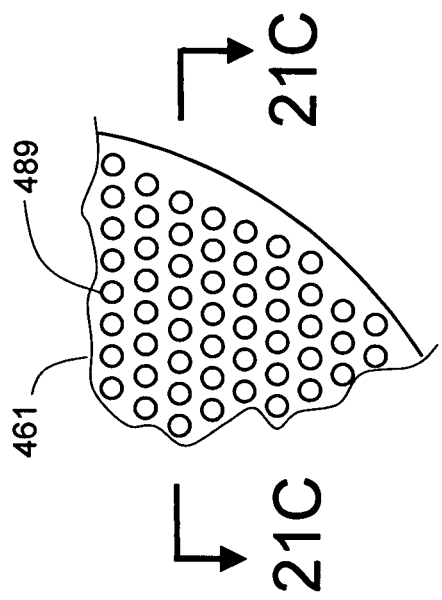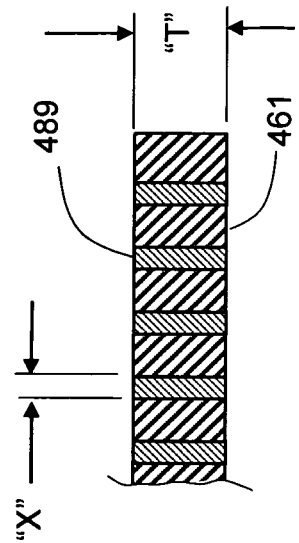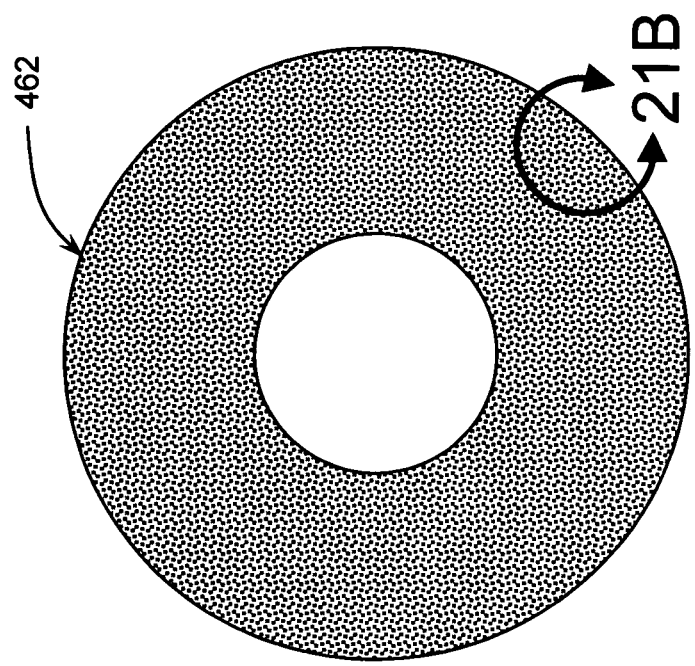

MAGNETOCALORIC REFRIGERATOR

CROSS-REFERENCE TO RELATED APPLICATIONS

This application claims priority from U.S. provisional patent application U.S. Ser. No. 61/397,246, filed on Jun. 7, 2010 and entitled "Magneto-Caloric Refrigerator" and from U.S. provisional patent application U.S. Ser. No. 61/397,175, filed on Jun. 7, 2010 and entitled "Staged Magneto-Caloric Refrigerator," the entire contents of all of which are hereby expressly incorporated by reference.

FIELD OF THE INVENTION

This invention relates generally to magnetocaloric machines and more specifically to heat pumps based on magnetocaloric effect.

BACKGROUND OF THE INVENTION

The subject invention is an apparatus and method for magneto-caloric refrigerator (MCR) offering improved energy efficiency, and reduced emissions of pollutants and greenhouse gases.

According to the U.S. Department of Energy, refrigeration and air conditioning in buildings, industry, and transportation may account for approximately $10^{19}$ joules of yearly primary energy consumption in the U.S.A. Air conditioning is also a major contributor to electric utility peak loads, which incur high generation costs while generally using inefficient and polluting generation turbines. In addition, peak loads due to air conditioning may be a major factor in poor grid reliability. Most of the conventional air conditioning, heat pumps, and refrigerators may achieve cooling through a mechanical vapor compression cycle. The thermodynamic efficiency of the vapor compression cycle is today much less than the theoretical maximum, yet dramatic future improvements in efficiency are unlikely. In addition, the hydrofluorocarbon refrigerants used by vapor compression cycle today are deemed to be strong contributors to the green house effect. Hence, there is a strong need for innovative approaches to cooling with high efficiencies and net-zero direct green house gas emissions.

The magneto-caloric effect (MCE) describes the conversion of a magnetically induced entropy change in a material to the evolution or absorption of heat, with a corresponding rise or decrease in temperature. In particular, MCE material may heat up when it is immersed in magnetic field and it may cool down when removed from the magnetic field.

All magnetic materials, to a greater or lesser degree, may exhibit an MCE. However, some materials, by virtue of a unique electronic structure or physical nanostructure, may display a significantly enhanced MCE, which may potentially be harnessed for technological application. In contrast to the MCE found in paramagnetic materials, the large MCE exhibited by ferromagnetic materials near their magnetic phase transition temperature (also known as the Curie temperature or Currie point) may render them suitable as working materials for magnetic cooling at the target temperatures appropriate for commercial, industrial, and home refrigeration application and heat pump devices, namely 200 to 400 degrees Kelvin. For example, gadolinium (Gd) is a ferromagnetic material known to exhibit a significant MCE near its Curie point of about 293 degrees Kelvin. In recent years, a variety of other MCE materials potentially suitable for operation at near room temperature have been discovered. See, for example, "Chapter 4: Magnetocaloric Refrigeration at Ambient Temperature," by Ekkes Bruck in "Handbook of Magnetic Materials," edited by K. H. J. Buschow, published by Elsevier B.V., Amsterdam, Netherlands, in 2008.

One of the very promising novel MCE materials is the intermetallic compound series based on the composition $Gd_5(Si_xGe_{1-x})_4$, where $0.1 \leq x.1 \leq 0.5$, disclosed by K. A. Gschneider and V. K. Pecharsky in U.S. Pat. No. 5,743,095 issued on Apr. 28, 1998 and entitled "Active Magnetic Refrigerants based on Gd—Si—Ge Materials and Refrigeration Apparatus and Process," which is hereby incorporated by reference in its entirety. See also and article by V. K. Pecharsky and K. A. Gschneider, "Tunable Magnetic Refrigerator Alloys with a Giant Magnetocaloric Effect for Magnetic Refrigeration from ~20 to ~290K," published in Applied Physics Letters, volume 70, Jun. 16, 1997, starting on page 3299. MCE produced by this family of compounds, also referred to as GdSiGe, has been labeled as "giant" because of its relatively large magnitude (reported as 4 to 6 degrees C. per Tesla of magnetic flux density). In particular, the MCE of the GdSiGe alloys may be reversible. Another noteworthy characteristic of the GdSiGe family is that the Curie temperature, may be tuned with compositional variation. This feature allows the working temperature of the magnetic refrigerator to vary from 30 degrees Kelvin to 276 degrees Kelvin, and possibly higher, by adjusting the Si:Ge ratio. For the purpose of this disclosure, an MCE material is defined as a suitable material exhibiting a significant MCE.

A magneto-caloric refrigerator (MCR) is a refrigerator based on MCE. MCR offers a relatively simple and robust alternative to traditional vapor-compression cycle refrigeration systems. MCR devices may have reduced mechanical vibrations, compact size, and lightweight. In addition, the theoretical thermodynamic efficiency of MCR may be much higher than for a vapor compression cycle and it may approach the Carnot efficiency. An MCR may employ an MCE material (sometimes referred to as a magnetic refrigerant working material) that may act as both as a "coolant" producing refrigeration and a "regenerator" heating a suitable heat transfer fluid. When the MCE material is subjected to strong magnetic field, its magnetic entropy may be reduced, and the energy released in the process may heat the material. With the MCE material in magnetized condition, a first stream of heat transfer fluid directed into a thermal contact with the MCE material may be warmed in the process and the heat may be carried away by the flow. When substantial portion of the heat is removed from the MCE material, the fluid flow may be terminated. As the next step, the magnetic field may be reduced, which may cause an increase in magnetic entropy. As a result, the MCE material may cool. A second stream of heat transfer fluid may be directed into a thermal contact with the MCE material where may deposit some of its heat and it may be cooled in the process. When substantial portion of the heat is deposited into the MCE material, the fluid flow may be terminated. Repeating the above steps may result in a semi-continuous operation. One disadvantage of such an MCR is the need for multiple flow loops typically involving pumps, heat exchangers, and significant plumbing.

Despite the apparent conceptual simplicity, there are significant challenges to the development of a practical MCR suitable for commercial applications. This is in-part due to the relatively modest temperature changes (typically few degrees Kelvin per Tesla of magnetic flux density) of the MCE material undergoing MCE transition. In addition, at present time the magnetic field produced by permanent magnets is limited to about 1.5 Tesla maximum. As a result, an MCR using permanent magnets and a single step MCE process may produce only a few degrees Kelvin temperature differential. Many important practical applications such as commercial refrigeration and air conditioning may require substantially higher temperature differentials, typically 30 degrees Kelvin and higher.

One approach to achieving commercially desirable temperature differentials from MCR may use multiple MCR stages (also known as cascades). Heat flow between stages may be managed by heat switches. Each stage contains a suitable MCE material undergoing magnetocaloric transition at a slightly different temperature. While the temperature differential achieved by one stage may be only a few degrees Kelvin, the aggregate operation of multiple stages may produce very large temperature differentials. See, for example, "Thermodynamics of Magnetic Refrigeration" by A. Kitanovski, P. W. Egolf, in International Journal of Refrigeration, volume 29 pages 3-21 published in 2006 by Elsevier Ltd., the entire contents of which are hereby expressly incorporated by reference.

A variety of heat switching approaches have been proposed but none has won commercial acceptance. For example, Ghoshal, in U.S. Pat. No. 6,588,216 entitled "Apparatus and methods for performing switching in magnetic refrigeration systems," issued on Jul. 8, 2003, and incorporated herein by reference in its entirety, discloses switching of thermal path between MCR stages by mechanical means using micro-electro-mechanical systems (MEMS), and/or electronic means using thermoelectric elements. Ghoshal's thermal path switching by MEMS is inherently limited by the poor thermal conductivity of bare mechanical contacts. Ghoshal's thermoelectric switches have very limited thermodynamic efficiency which substantially increases the heat load to the MCR and reduces the overall MCR efficiency.

In summary, there is a need for 1) reducing or eliminating moving parts and pumped fluid loops in MCR systems, 2) simpler and more reliable MCR operation, and 3) means for attaining commercially desirable temperature differentials from MCR. A specific need exists for reliable, low-thermal resistance means for switching of the heat flow to and from the MCE material in staged (cascaded) MCR.

SUMMARY OF THE INVENTION

The present invention provides a magneto-caloric refrigerator (MCR) having one or more stages. The MCR of the subject invention may use MCE material formed as one or more members alternately exposed to strong and weak magnetic field. Exposure to magnetic field may be coordinated by switching of heat to and from the MCE material by heat commutators comprising a thermally conductive core. Thermal communication between the MCE material and the thermally conductive cores is facilitated by a thin layer of suitable thermal interface fluid (TIF) located therebetween. In particular, an MCE material immersed in a weak magnetic field is arranged to be in a good thermal communication with a thermally conductive core of the heat commutator operating at a lower temperature, and an MCE material immersed in a strong magnetic field is arranged to be in a good thermal communication with a thermally conductive core of a commutator operating at a higher temperature.

More specifically, in accordance with one preferred embodiment of the subject invention, the MCR comprises a suitable MCE material formed as one or more annular disks (MCE rings), heat commutators formed as two or more annular disks, and a thermal interface fluid (TIF). The commutators are arranged generally equally spaced on a common axis and affixed in space. The disks of MCE material are placed each between adjacent commutators, arranged to be concentric therewith, and affixed to a common shaft arranged to rotate about them their axis of symmetry. The axial gap between adjacent disks and commutators is arranged to be very small, typically on the order of about 50 to about 500 micrometers, and it is filled with the TIF. The commutator comprises a thermally conductive core, thermally insulating portions, and one or more permanent magnets. The permanent magnet in each commutator is arranged to have its magnetization vector generally parallel to the commutator axis of rotational symmetry. The commutators are clocked about their common axis so that their permanent magnets are placed at the same azimuthal position and their magnetization vectors at that position are pointing in the same direction. In particular, the magnets are arranged so that an MCE disk rotating between adjacent commutators would be cyclically exposed to a sequence of relatively low magnetic field, increasing magnetic field, strong magnetic field, and decreasing magnetic field. For example, a given portion of an MCE disk may be immersed a stronger magnetic field when it is between the magnets, and it may be immersed a weaker magnetic field when it is away from the magnets.

For the purposes of this disclosure, the term "strong magnetic field" is defined as a magnetic field having an absolute value of magnetic flux density of at least 0.3 Tesla (3,000 Gauss), and the term "weak magnetic field" is defined as a magnetic field having an absolute value of magnetic flux density of at least 0.1 Tesla (1,000 Gauss) lower than the "strong magnetic field" flux density. In particular, the range of weak magnetic field may include magnetic flux density of essentially zero (0) Tesla (i.e., no field).

In operation, the shaft is arranged to rotate about its axis, thus rotating the MCE disks between the stationary commutators. Rotary motion may cause the TIF layer in the gaps between adjacent MCE disks and commutator to flow in a regime known as a shear flow and also known as a Couette flow. Rotary motion may cyclically expose a given portion of an MCE disk to a sequence of relatively low magnetic field, increasing magnetic field, strong magnetic field, and decreasing magnetic field. As a result, a given portion of an MCE disk may cyclically undergo relative warming and relative cooling due to MCE.

In a single stage MCR in accordance with the subject invention, an MCE disk has a first planar surface adjacent to a first heat commutator with a first small axial gap therebetween and a second planar surface adjacent to a second heat commutator with a second small axial gap therebetween. Said first gap and said second gap are each filled with a suitable TIF. The thermally insulating portion of the first commutator is arranged to be in a contact via TIF with a portion of the MCE disk immersed in an increasing magnetic field, strong magnetic field, and decreasing magnetic field. The thermally conductive core of the first commutator is arranged to be in a good thermal contact by means of TIF with a portion of the MCE disk immersed a weak magnetic field. Note that the terms "by means of" and "via" may be used interchangeably in this disclosure. The thermally conductive core of the second commutator is arranged to be adjacent to and in a good thermal contact via TIF with a portion of the MCE disk immersed in a strong magnetic field. The thermally insulating portion of the second commutator is arranged to be adjacent to and in a contact with a portion of the MCE disk immersed in a decreasing magnetic field, weak magnetic field, and increasing magnetic field. As a result, the first commutator may be in a good thermal contact with a cooler portion (or portions) of the MCE disk while the second commutator may be in a good thermal contact with a warmer portion (or portions) of the MCE disk. Hence the rotation of the MCE disk causes the first commutator to become cooler and the second commutator to become warmer. By connecting the thermally conductive core of the first commutator to a heat load (a heat reservoir at a lower temperature) and the thermally conductive core of the second commutator to a heat sink (a heat reservoir at a higher temperature), the MCR may pump heat from the heat load to the heat sink.

In a multiple stage MCR in accordance with the subject invention, heat may be transported from one adjacent MCE disk to another through a shared commutator located between them. In particular, the thermally conducting core of the shared commutator is arranged to be in a good thermal contact via TIF with a portion of a lower stage (generally cooler) MCE disk immersed in a strong magnetic field and simultaneously in a good thermal contact via TIF with a portion of an adjacent higher stage (generally warmer) MCE disk immersed in a weak magnetic field.

The thermal interface fluid (TIF) is a key material for facilitating very low resistance heat transfer in the MCR of the subject invention. For the purpose of this disclosure, TIF may be a liquid or a paste. Preferably, suitable TIF has a good thermal conductivity, surface wetting capability, lubrication properties, low melting point, acceptably low viscosity, low or no toxicity, and low cost. The inventor has determined that TIF should preferably have a thermal conductivity of at least as 1 W/m-degree K and most preferably at least 3 W/m-degree K. In some embodiments of the invention the TIF may be a liquid metal. Suitable liquid metal may be an alloy of gallium (Ga) such as a non-toxic eutectic ternary alloy known as galinstan and disclosed in the U.S. Pat. No. 5,800,060. Galinstan (68.5% gallium, 21.5% indium, and 10% tin) is reported to have thermal conductivity of about 16 W/m-degree K (about 27 times higher than water), a melting point of minus 19 degrees Centigrade, low viscosity, and excellent wetting properties. Brandeburg et al. in the U.S. Pat. No. 7,726,972 discloses a quaternary gallium alloy having a melting point of minus 36 degrees Centigrade, which may be also suitable for use with the subject invention. Other suitable gallium alloys may include those disclosed in the U.S. Pat. No. 5,792,236.

In other embodiments of the invention the TIF may also comprise a fluid containing nanometer-sized particles (nanoparticles) also known as nanofluid. Nanofluids are engineered colloidal suspensions of nanoparticles in a base fluid. The nanoparticles used in nanofluids may be typically made of metals, oxides, carbides, carbon, graphite, graphene, graphite nanotubes, or carbon nanotubes. Common base fluids may include water, alcohol, and ethylene glycol. Nanofluids may exhibit enhanced thermal conductivity and enhanced convective heat transfer coefficient compared to the base fluid alone. In yet other embodiments of the invention the TIF may not be strictly a fluid but rather a paste comprising mainly of micro-scale and/or nano-scale particles made of high thermal conductivity materials such as silver, copper, or graphite in suitable base liquid or paste.

Accordingly, it is an object of the present invention to provide an MCR that is relatively simple and robust alternative to traditional vapor-compression cycle refrigeration systems, while attaining comparable or even higher thermodynamic efficiency.

It is another object of the invention to provide an MCR for general refrigeration and air conditioning while improving energy efficiency and reducing emissions of pollutants and greenhouse gases.

It is yet another object of the invention to provide an MCR having one or more stages to achieve commercially useful temperature differentials.

It is still another object of the subject invention to provide an MCR having low mechanical vibrations, compact size, and lightweight coupled with a thermodynamic efficiency exceeding that of thermo-electric coolers.

It is a further object of the subject invention to provide efficient switching of heat to and from an MCE material.

These and other objects of the present invention will become apparent upon a reading of the following specification and claims.

BRIEF DESCRIPTION OF THE DRAWINGS

FIG. 7A is an isometric view of the MCE disk.

FIG. 7B is a cross-sectional view 7B-7B of the MCE disk of FIG. 7A.

FIG. 8A is an isometric view of the heat commutator with one side facing up.

FIG. 8B is an isometric view of the heat commutator of FIG. 8A with the reverse side facing up.

FIG. 8C is an isometric view of the commutator of FIG. 8A with a partial section exposing selected internal features.

FIG. 9A is a cross-sectional view 9A-9A of the heat commutator of FIG. 8A.

FIG. 9B is a cross-sectional view 9B-9B of the heat commutator of FIG. 9A.

FIG. 11 is a cross-sectional view 11-11 of the commutator of FIG. 10A.

FIG. 12A is an isometric view of the permanent magnets and the yokes of the SMCR of FIG. 1 with all other components removed from the view.

FIG. 12B is an isometric view of the permanent magnets and the yokes of FIG. 12A rotated 45 degrees clockwise to expose obstructed elements.

FIG. 19A is an isometric view of an alternative thermally conductive core with the reverse side facing up.

FIG. 19B is an isometric view of an altenative thermally conductive core of FIG. 19A with the reverse side facing up.

FIG. 20A is a view of an alternative MCE ring for reduced parasitic heat flow in azimuthal direction.

FIG. 20B is a cross-sectional view 20B-20B of the alternative MCE ring of FIG. 20A.

FIG. 21A is a view of another alternative MCE disk having portions made of material having high thermal conductivity.

FIG. 21B is an enlarged view of portion 21B of the another alternative MCE ring of FIG. 21A.

FIG. 21C is an enlarged cross-sectional view 21C-21C of FIG. 21B.

DETAILED DESCRIPTION OF THE PREFERRED EMBODIMENTS

Figure 1:
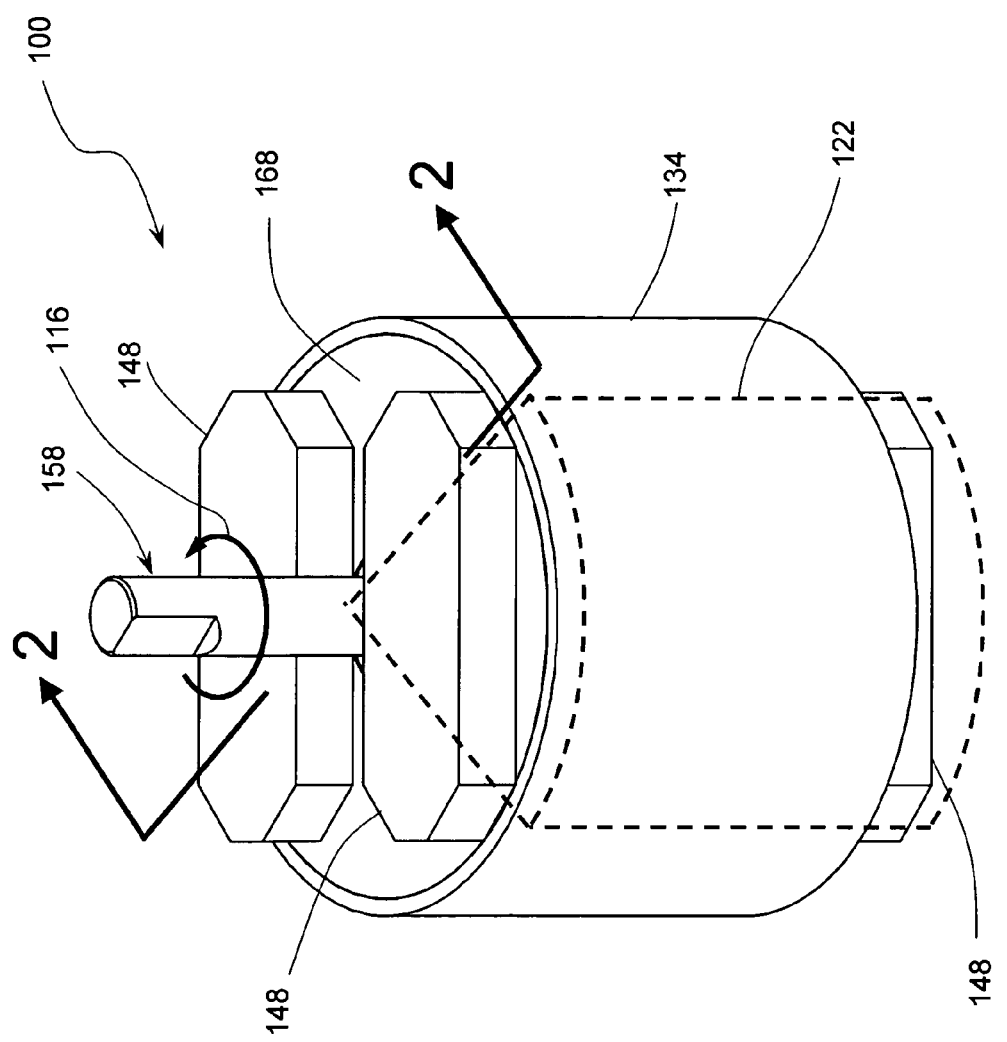
FIG. 1 is an isometric view of the SMCR apparatus of the subject invention.

Selected embodiments of the present invention will now be explained with reference to drawings. In the drawings, identical components may be provided with identical reference symbols in one or more of the figures. It will be apparent to those skilled in the art from this disclosure that the following descriptions of the embodiments of the present invention are merely exemplary in nature and are in no way intended to limit the invention, its application, or uses.

Referring now to FIGS. 1, 2, 3, and 4, there is shown an MCR apparatus 100 in accordance with one preferred embodiment of the present invention. Note that the isometric view of FIG. 3 having a partial section is formed from the view in FIG. 1 by removing the quadrant-like volume identified in FIG. 1 by a broken line 122. The MCR apparatus 100 has six (6) stages and it comprises six (6) MCE disks 154, seven (7) heat commutators 160, five (5) spacer disks 172, six (6) spacer rings 176, four (4) magnetic flux returns 148, end caps 168 and 170, two (2) bearings 138, a drive shaft 158, and an enclosure shell 134.

Figure 2:
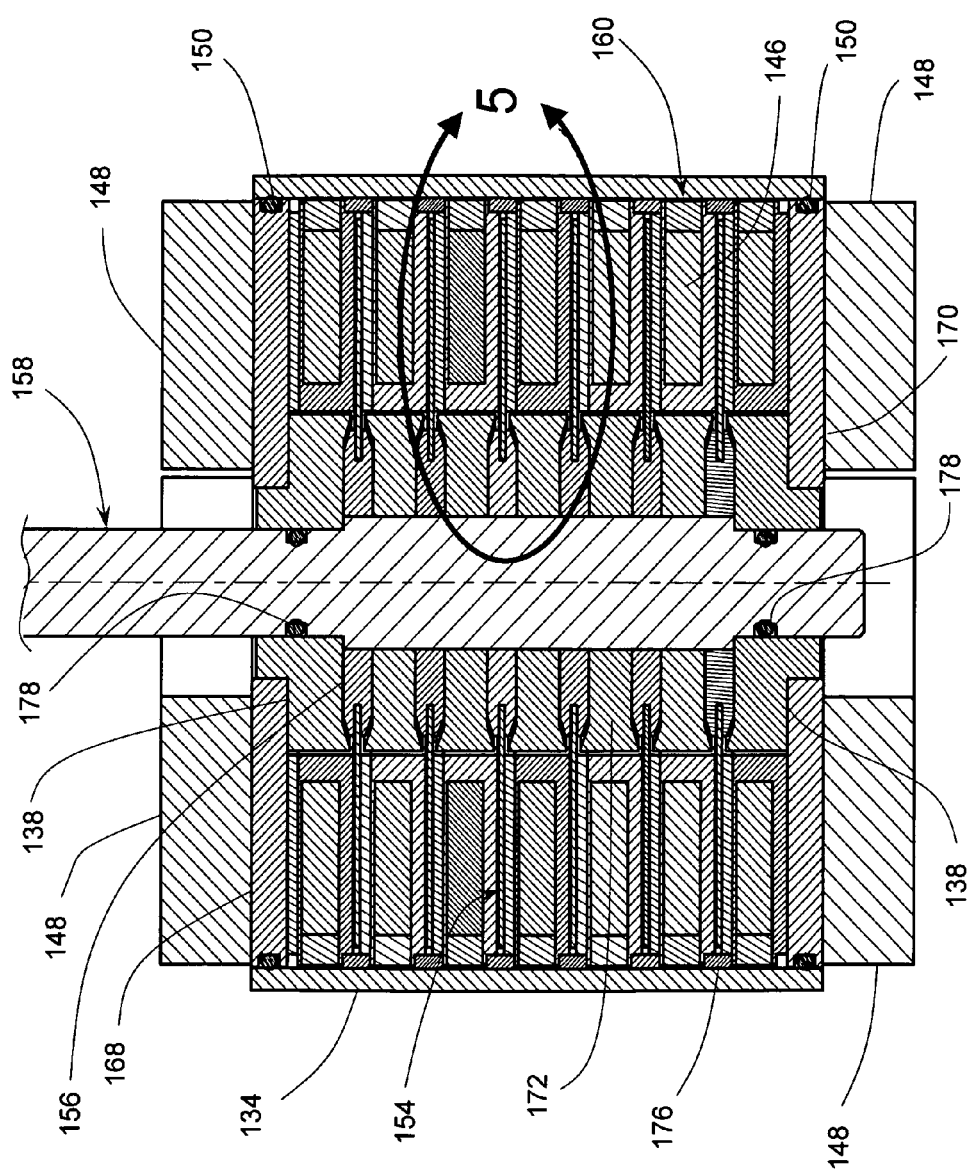
FIG. 2 is a cross-sectional view 2-2 of the SMCR apparatus shown in FIG. 1.
Figure 3:
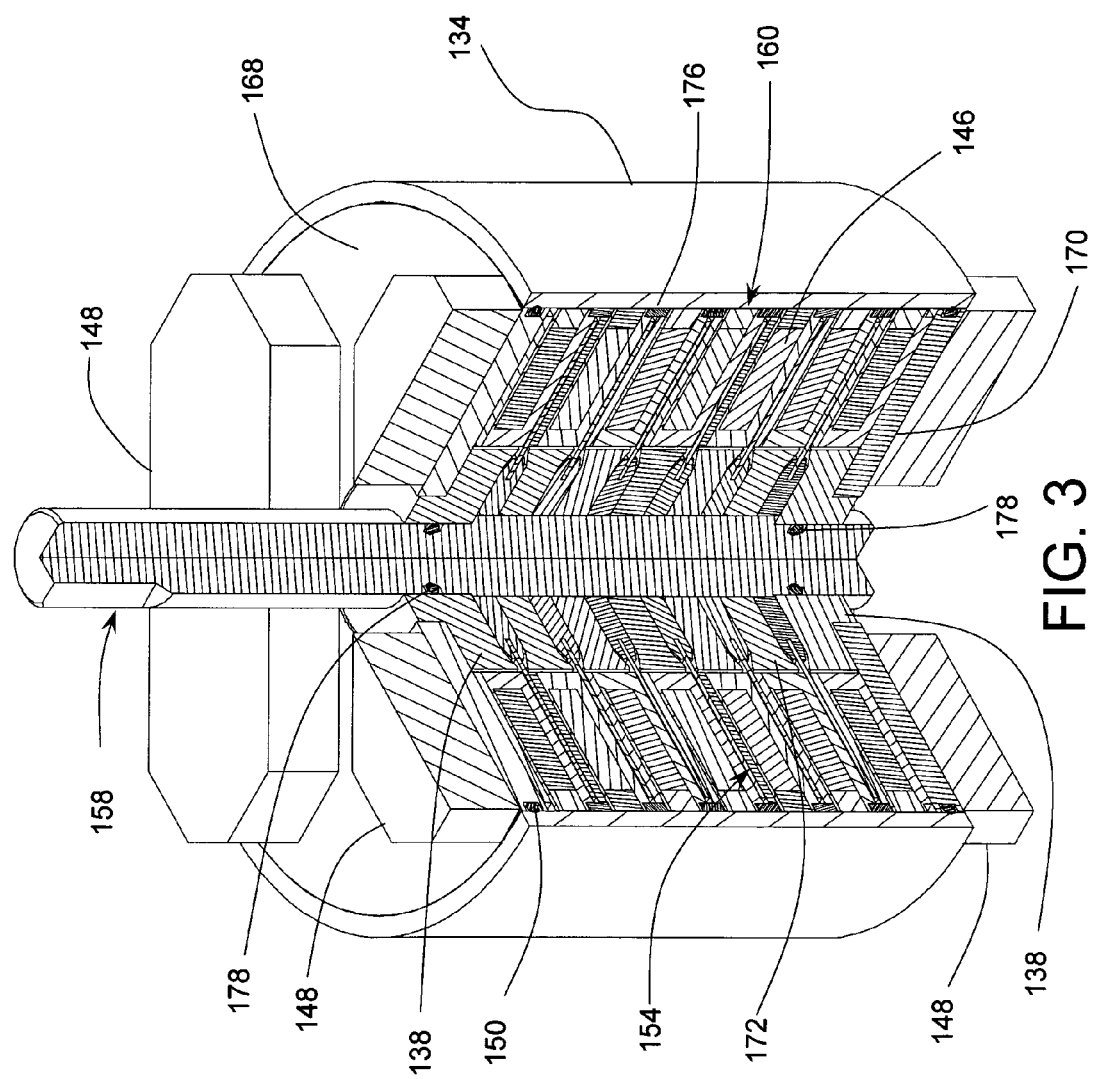
FIG. 3 is an isometric view of the SMCR apparatus of FIG. 1 with a partial section exposing selected internal features.
Figure 4:
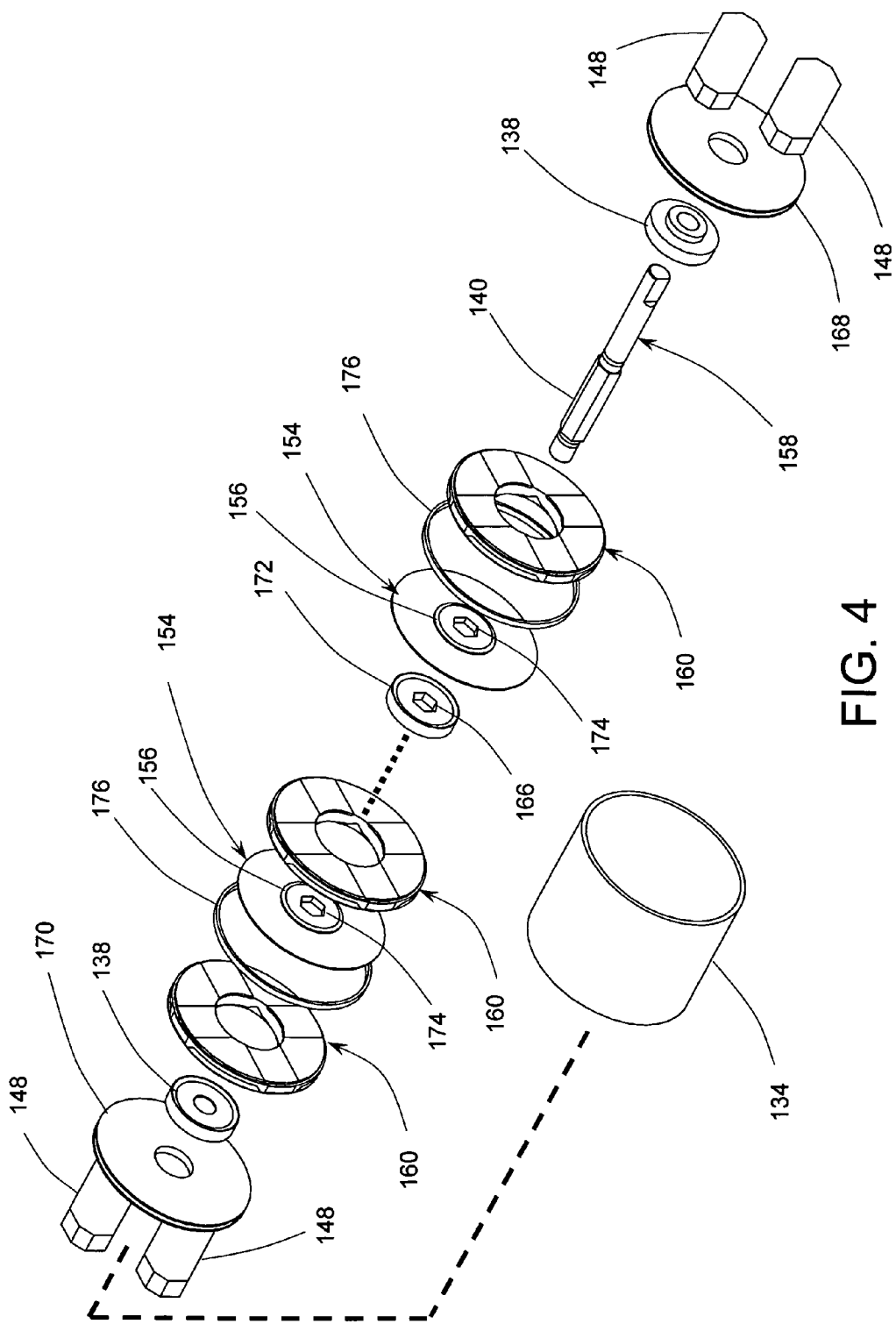
FIG. 4 is an exploded view of the SMCR apparatus of FIG. 1 omitting certain repeated components.

Referring now to FIGS. 2, 3, and 4, the enclosure 134 may be a round tubular member. The heat commutators 160 may be generally formed as annular disks (FIG. 4) arranged equally spaced on a common axis and fixed with respect to the enclosure shell 134. Spacing of the heat commutators 160 may be defined by the spacer rings 176 which may be also fixed with respect to the enclosure shell 134. The MCE disks 154 may be placed to interspace the heat commutators 160, arranged to be concentric therewith, and positioned on the drive shaft 158. In particular, the hexagonal hole 174 (FIG. 4) of the hub 156 of the MCE disk 154 may slidingly engage the hexagonal surface 140 of the drive shaft 158. Axial position of the MCE disks 154 on the drive shaft 158 may be maintained by spacer disks 172 interspacing the MCE disks 154. The hexagonal hole 166 (FIG. 4) of the spacer disk 172 may slidingly engage the hexagonal surface 140 of the drive shaft 158. The drive shaft 158 may be rotatably suspended in the bearings 138 installed in the end caps 168 and 170. O-rings 178 (FIGS. 2 and 3) may be installed on the shaft 158 to provide seals. The end caps 168 and 170 may include o-rings 150 (FIGS. 2 and 3) to provide seals to the enclosure shell 134. The heat commutators 160 comprise permanent magnets 146 (FIGS. 2 and 3). The magnetic flux returns 148 may be installed on the end caps 168 and 170 to reduce the reluctance of the magnetic circuit formed by the permanent magnets 146.

Figure 5:
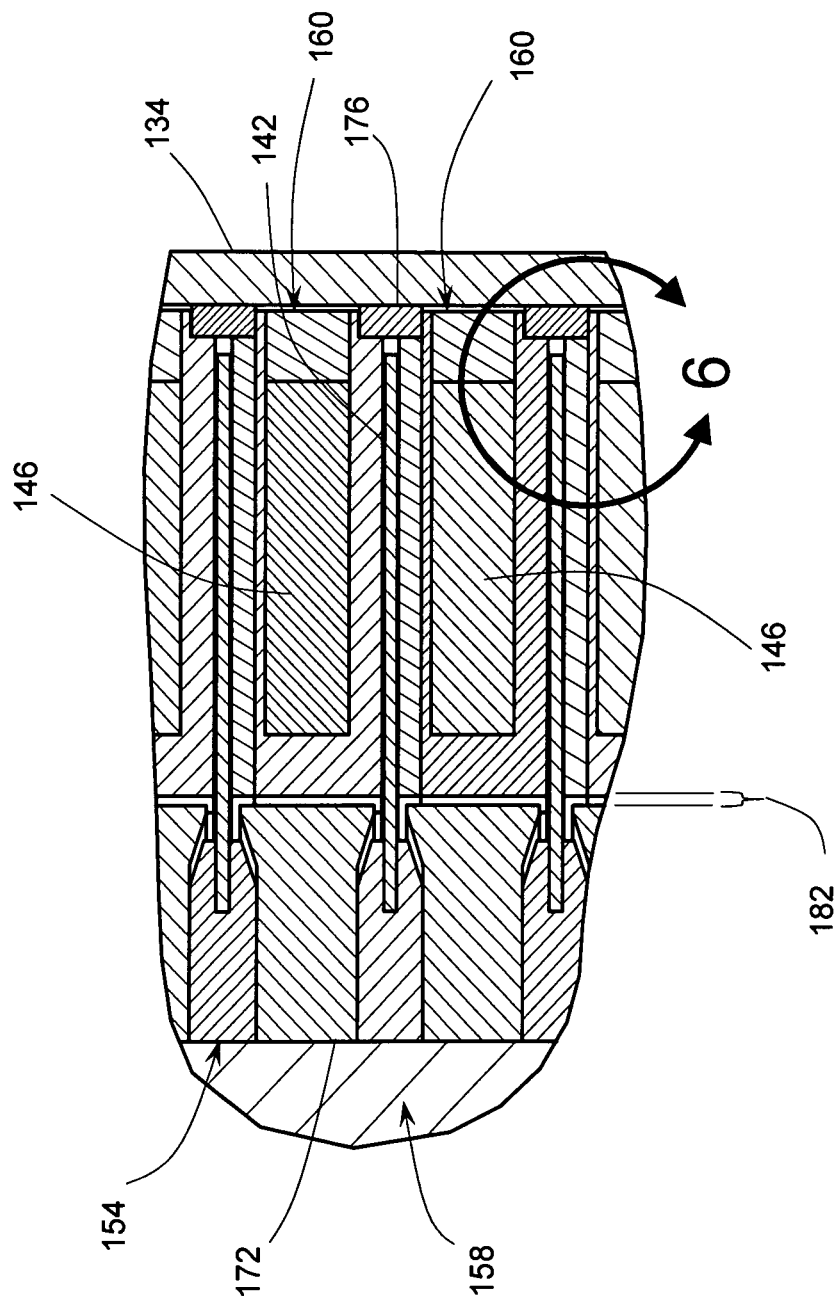
FIG. 5 is an enlarged view of portion 5 of FIG. 2.
Figure 6:
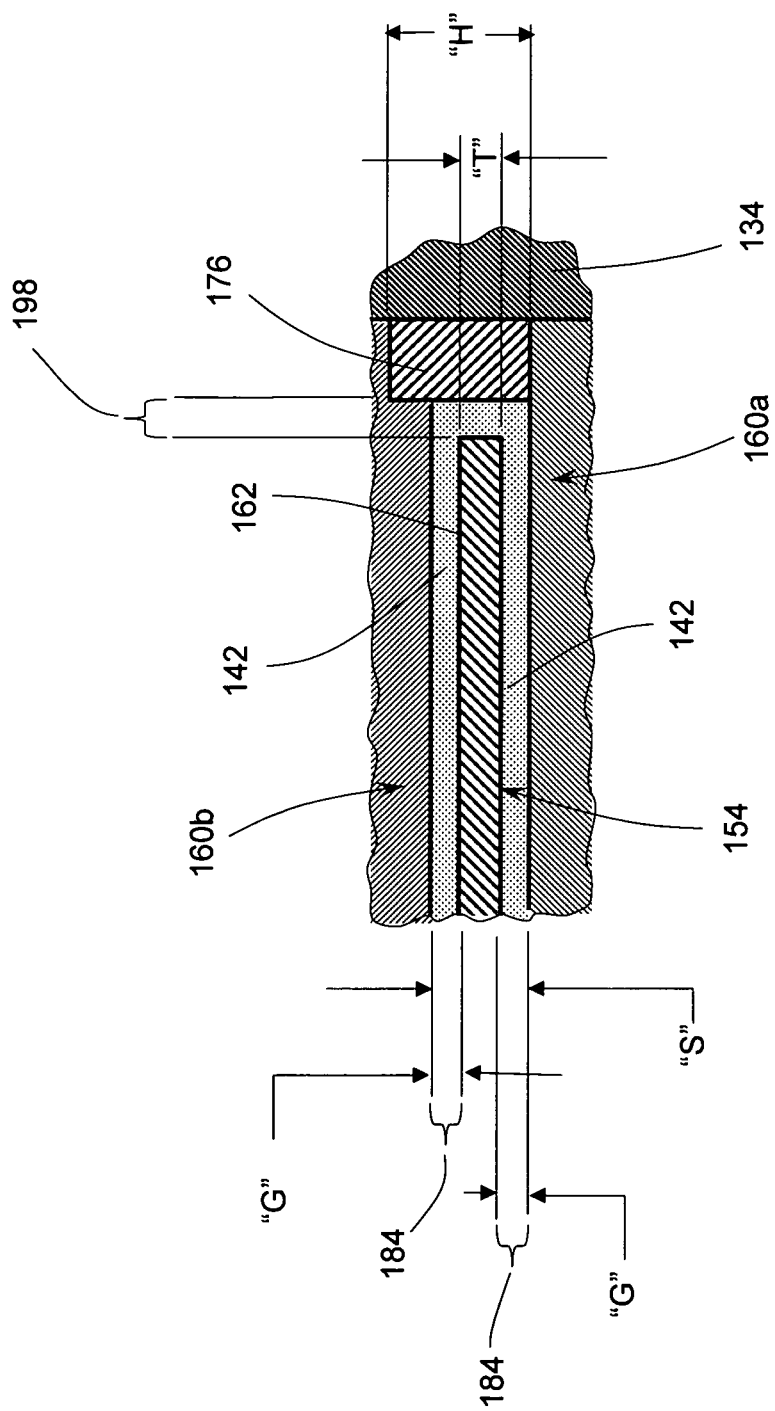
FIG. 6 is an enlarged portion 6 of FIG. 5.

Referring now to FIG. 5, the spacer disks 172 are sized to provide a radial clearance gap 182 between the outside diameter of the spacer disks 172 and the inside diameter of the heat commutators 160. Referring now to FIG. 6, the clearance space "S" between adjacent commutators 160a and 160a, and the thickness "T" of the MCE disk 154 are chosen so that the width "G" of axial gaps 184 between MCE disk 154 and heat commutators 160a and 160a is preferably between about 50 micrometers and about 500 micrometers (about 2 thousands of an inch and about 20 thousands of an inch). Generally, the width "G" may be adjusted by appropriately defining the height "H" of the spacer rings 176. In addition, the outside diameter of the MCE disk 154 is set to provide a radial clearance gap 198 between the perimeter of the MCE disk 154 and the spacer ring 176. Preferably, the MCE disk 154 is axially positioned about half way between the permanent magnets 146 (FIG. 6) in adjacent heat commutators 160a and 160a to balance the magnetic forces of attraction. The gaps 182, 184, and 198 should be arranged to ensure that the shaft 158 together with the MCE disks 154 and the spacer disks 172 can freely rotate on the bearings 138 while preventing the MCE disks 154 and the spacer disks 172 from rubbing on the heat commutators 160a and 160a and on the spacer rings 176. The gaps 182, 184, 198 are filled with a suitable thermal interface fluid (TIF) 142. A list of exemplary TIF that may be suitable for practicing with the MCR 100 has been provided above.

Note that choosing a small width "G" of the gap 184 may beneficially improve thermal communication between the MCE disk 154 and the heat commutators 160a and 160a, but the manufacturing tolerances of the MCR 100 may become more challenging. Conversely, choosing a large width "G" of the gap 184 may beneficially relax manufacturing tolerances of the MCR 100 at the expense of reduced thermal communication between the MCE disk 154 and the heat commutators 160a and 160a.

If the TIF 146 comprises gallium and its alloys, metal components of the MCR 100 may require protective coating to prevent corrosion. Metal components requiring anti-corrosion coating may include portions the MCE disk 154, portions of the commutators 160, and the end caps 168 and 170. Suitable protective coatings may include but they are not limited to titanium nitride (TiN) and the diamond-like coating (DLC) Titankote C11 available from Richter Precision, Inc. in East Petersburg, Pa.

The shaft 158, enclosure shell 134, spacer disks 172, spacer rings 176, and MCE disk hubs 156 (FIG. 4) are preferably made from a material having very low thermal conductivity. Such suitable materials may include, but they are not limited to, epoxies including fiberglass epoxy and graphite epoxy, glass fiber silicons, plastics including polyvinylchloride (PVC), polystyrene, polyethylene, acrylics, Teflon®, and ceramics. In addition, some of these parts (namely, the drive shaft 158) may be made hollow to further reduce their thermal conductance. Furthermore, the outer perimeter of the enclosure shell 134 may be equipped with a suitable thermally insulating jacket (not shown). Suitable thermally insulating jacket may be made from, but it is not limited to, polystyrene foam.

The bearings 138 are preferably made of made from a material having low friction with respect to the material of the shaft. Alternatively, the bearings 138 may include anti-friction (i.e., rolling element) bearing portion. The o-rings 150 and 178 may be made from a suitable elastomeric material such as buna-n, silicon rubber, Viton®, or Teflon®. The end caps 168 and 170 are preferably made of made from a material having high thermal conductivity such as, but not limited to, copper, aluminum, silicon, silicon carbide, and aluminum nitride. The magnetic flux returns 148 are preferably made from a soft magnetic material having a high magnetic saturation such as, but not limited to, mild steel, low carbon steel, silicon steel, iron, iron-cobalt-vanadium alloys, Consumet® electrical iron, and Hyperco® 50. Consumet® electrical iron and Hyperco® 50 are available from Carpenter Technology Corporation in Wyomissing, Pa.

Referring now to FIGS. 7A and 7B, the MCE disk 154 comprises an MCE ring 162 and a hub 156. The MCE ring 162 may be formed from a suitable MCE material and it may be shaped as an annular disk having an outside diameter "D", width "W", and thickness "T". Typical range for the outside diameter "D" is from about 5 centimeters to about 30 centimeters, however, an MCE ring 162 having a diameter "D" outside this range may be also practiced. Typical range for the width "W" is from about 2 centimeters to about 12 centimeters, however, an MCE ring 162 having a width "D" outside this range may be also practiced. Typical range for the thickness "T" is from about 0.5 millimeters to about 5 millimeters, however, an MCE ring 162 having a thickness "T" outside this range may be also practiced. Preferably, the MCE material of each MCE ring 162 is optimized for the anticipated operating temperature range in accordance with its placement in the MCR 100. For example, if the MCE rings 162 are made of the above noted GdSiGe alloy, the Si:Ge ratio may be adjusted so that the alloy Currie point is near (or within) the anticipated operating temperature range of the MCE ring. The hub 156 is affixed to the MCE ring 162. The hub 156 has a hexagonal hole 174 for engaging the hexagonal surface 140 of the drive shaft 158. When the hub 156 is made of thermoplastic material, it may be molded directly onto the MCE ring 162.

Figure 10C:
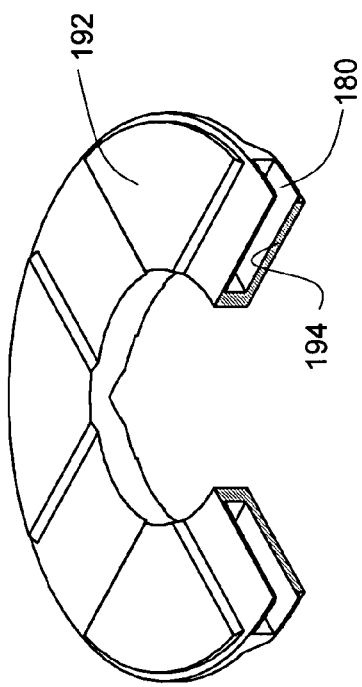
FIG. 10C is an isometric view of the thermally conductive core of FIG. 10A with a partial section exposing selected internal features.
Figure 10A:
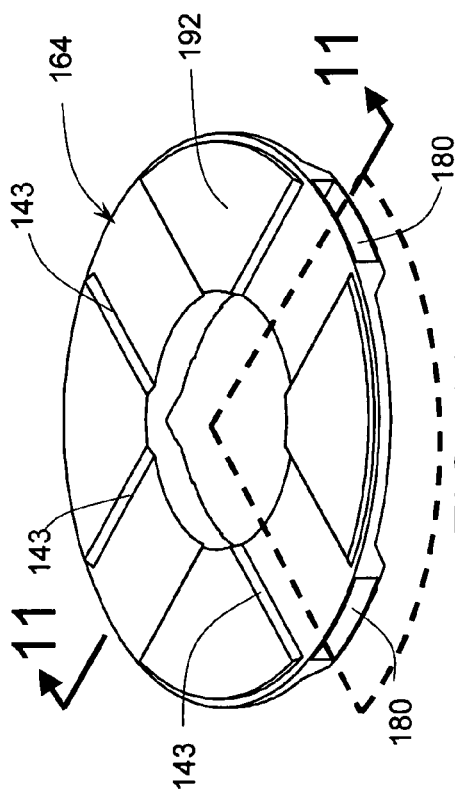
FIG. 10A is an isometric view of the thermally conductive core with one side facing up.

Referring now to FIGS. 8A, 8B, 8C, 9A, and 9B, the heat commutator 160 may be generally formed as an annular disk comprising a thermally conducting core 164, thermally insulating portions 151, 152, and 153, and permanent magnets 146. Note that the isometric view of FIG. 8C having a partial section is formed from the view in FIG. 8A by removing the quadrant-like volume identified in FIG. 8A by a heavy broken line. The thermally conducting core 164 shown in FIGS. 10A, 10B, 10C, and 11 may be generally formed as an annular disk-like member comprising thermal interface surfaces 192 and 194, sloped surfaces 143 and 144, and magnet pockets 180. Note that the isometric view of FIG. 10C having a partial section is formed from the view in FIG. 10A by removing the quadrant-like volume identified in FIG. 10A by a heavy broken line. The thermally conducting core 164 is preferably constructed from a material having high thermal conductivity. Materials suitable for construction of the thermally conducting core 164 may include, but they are not limited to, copper, aluminum, silicon, aluminum nitride, and silicon carbide. The thermally conducting core 164 may be fabricated as one piece using casting, conventional machining, molding, or electro-discharge machining (EDM), or any combination thereof, or by any other suitable technique. The insulating portions 151, 152, and 153 (FIGS. 8A, 8B, 8C, 9A, and 9B,) of the heat commutator 160 are preferably made from a material having a low thermal conductivity and/or being substantially thermally insulating. When the insulating portions 151, 152, and 153 are made of a suitable thermoplastic material, they may be molded directly onto the thermally conductive core 164.

Figure 10B:
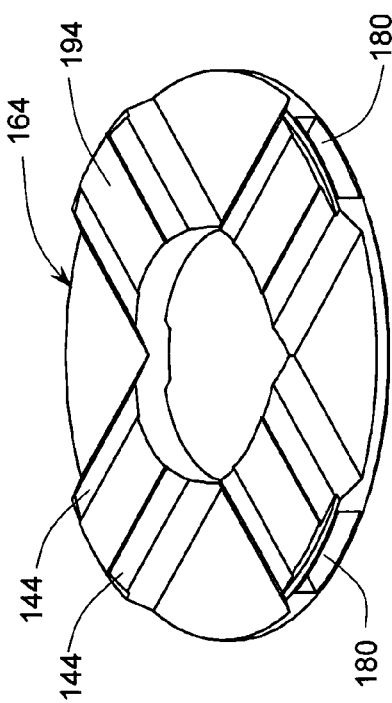
FIG. 10B is an isometric view of the thermally conductive core of FIG. 10A with the reverse side facing up.

The permanent magnets 146 may be installed in the pockets 180 within the thermally conducting core 164 (see FIGS. 10A, 10B, 10C, and 11) prior to installation of the insulating portion 153. Preferably, the insulating portions 153 seal the magnets 146 in their pockets 180 to prevent their exposure to the TIF. The permanent magnets 146 may be of the rare earth type such as a neodymium-iron-boron (NdFeB) composition having a remanent magnetic flux density in excess of 1.4 Tesla, but other types of permanent magnets may be also practiced with the subject invention. Preferably, the permanent magnets 146 are arranged to fit tightly into the pockets 180 to provide good thermal communication therebetween. The magnetization vectors 186 of the permanent magnets 146 are preferably arranged to be perpendicular to the thermal interface surfaces 194 of the thermally conducting core 164 (FIG. 10B). The direction of the magnetization vectors 186 is generally shown in FIG. 9B where the symbol "•" represents a magnetization vector being normal to the drawing sheet and pointing out toward the viewer, and the symbol "0" represents a magnetization vector being normal to the drawing sheet and pointing in away from the viewer.

When the commutators 160 are installed in the MCR 100 as shown in FIGS. 2, 3, and 4, the magnetization vectors of their permanent magnets 146 at each azimuthal position are aligned in the same direction. As a result, the permanent magnets 146 and the four (4) flux returns 148 form a magnetic structure 126 shown in FIGS. 12A and 12B. The magnets 146 in the magnetic structure 126 are arranged in four stacks 120a, 120b, 120c, and 120d. The magnets in each stack have their magnetization vectors 186 aligned in the same direction. Furthermore, the magnetization vectors 186 of the permanent magnets 146 in the stacks 120a and 120c are pointing in the same direction. The magnetization vectors 186 of the permanent magnets 146 in the stacks 120b and 120d are pointing in the same direction, which is opposite to the direction of magnetization vectors of the stacks 120a and 120c. Two (2) magnetic flux returns 148 are provided to close the magnetic circuit 190 (FIG. 12A) formed by the magnet stacks 120a and 120c. Another two (2) magnetic flux returns 148 are provided to close the magnetic circuit formed by the magnet stacks 120b and 120d.

Figure 13B:
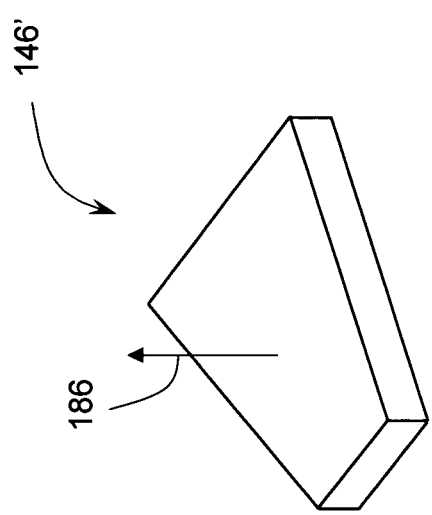
FIG. 13B is an isometric view of another alternative permanent magnet.
Figure 13A:
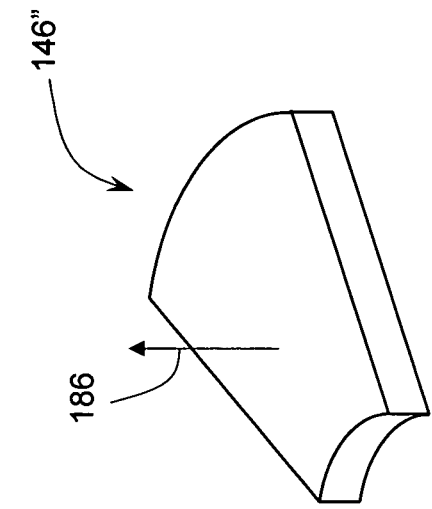
FIG. 13A is an isometric view of an alternative permanent magnet.

The permanent magnets 146 shown in FIGS. 12A and 12B are formed to a rectilinear shape. However, other magnet shapes may be also used with the subject invention. FIGS. 13A and B respectively show examples of alternative permanent magnet shapes 146' and 146" that may be used with the subject invention.

Figure 14:
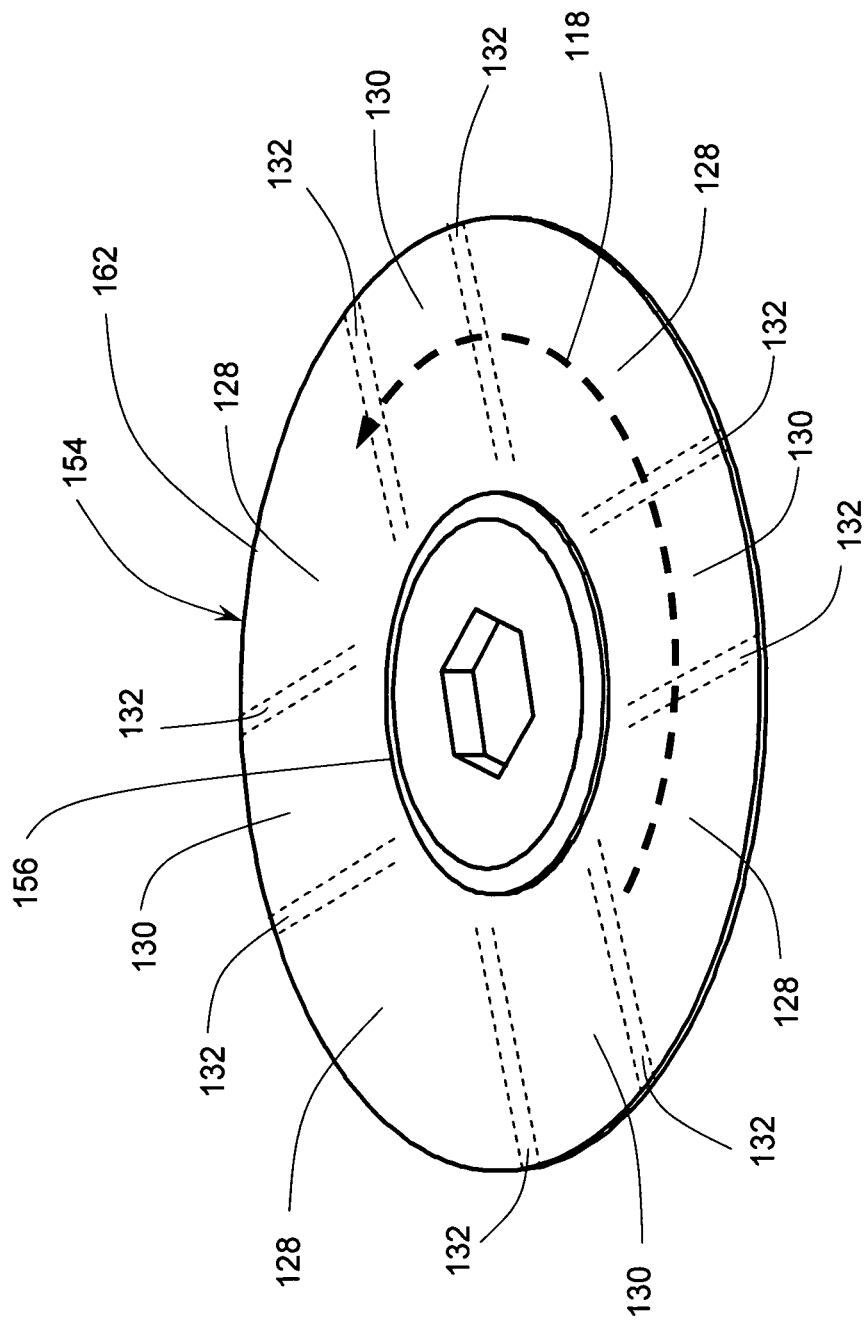
FIG. 14 is an isometric view of the MCE disk of FIG. 7A indicating regions exposed to specific magnetic field strength.
Figure 15:
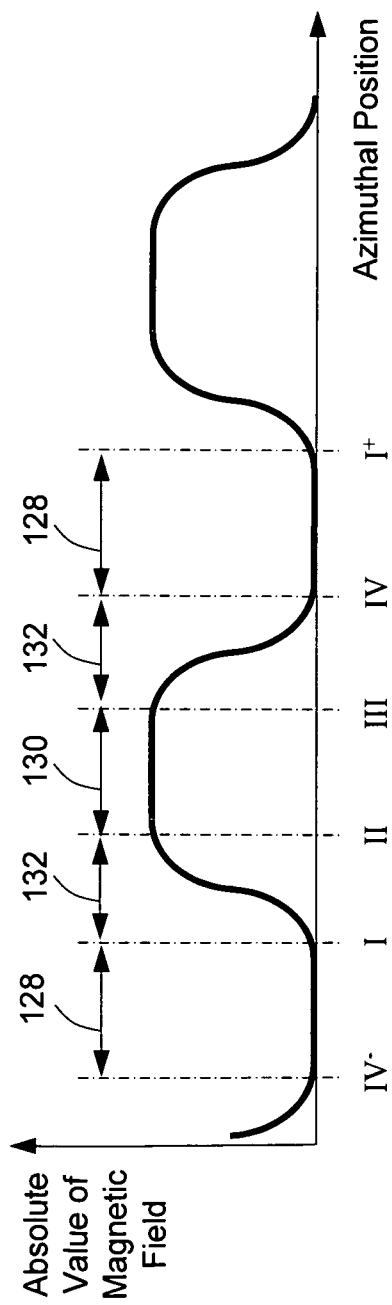
FIG. 15 is a plot of absolute magnetic field flux density along the heavy broken curve 118 of FIG. 14.
Figure 16:
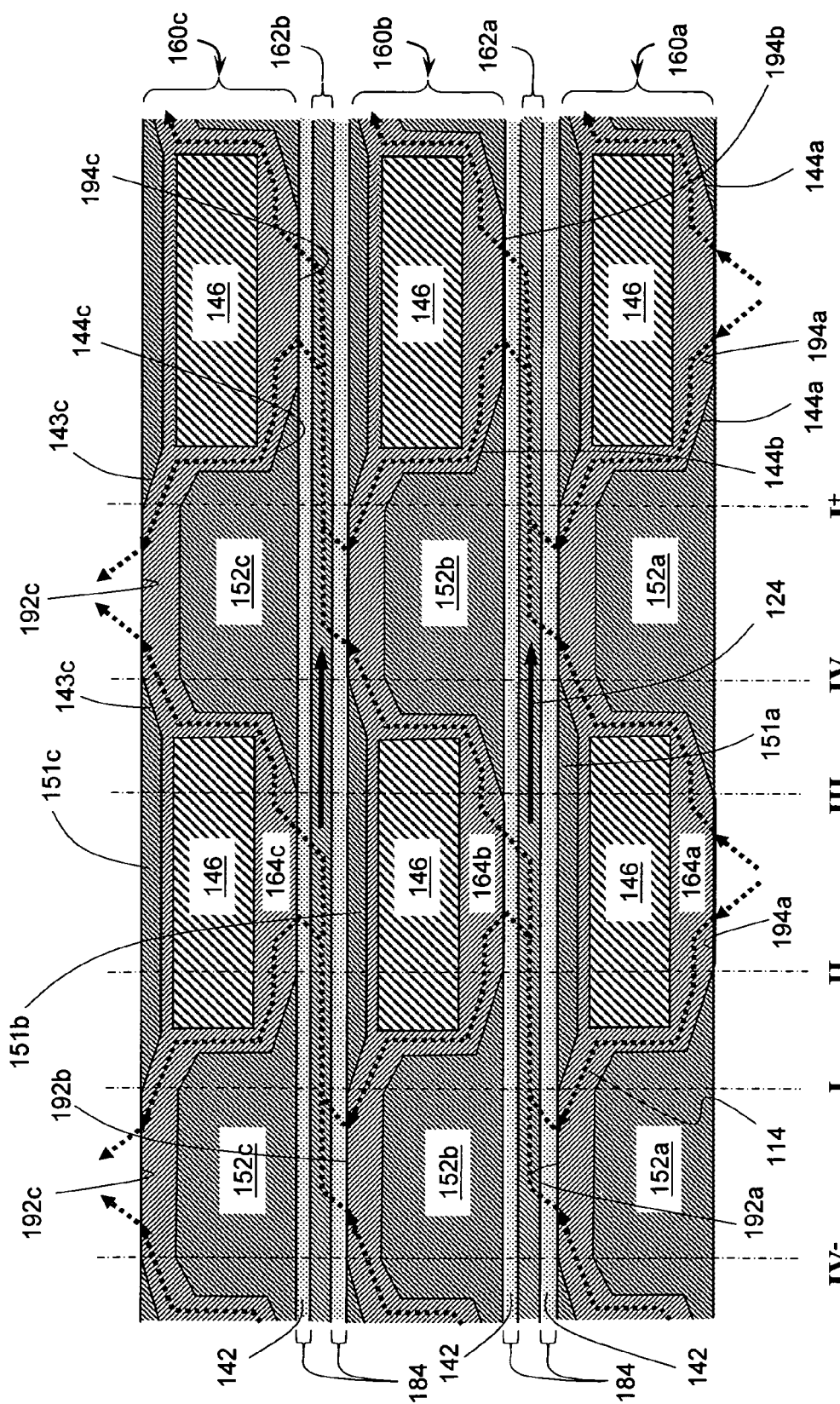
FIG. 16 is a cross-sectional view of a portion of the MCR of FIG. 1.

An MCE disk 154 installed in the MCR 100 will be exposed magnetic field spatially varying from weak to strong. FIG. 14 is an approximate map of the magnetic field in the MCE disk 154 identifying regions 130 of generally constant and strong magnetic field, regions 128 of generally constant and weak magnetic field, and regions 132 of increasing or decreasing magnetic field having strong gradient. FIG. 15 shows a typical profile of absolute magnetic field value along an azimuthal path 118 in the MCE ring 162 of FIG. 14. Azimuthal positions I, II, III, and IV generally define boundaries between regions of specific magnetic field strength. In particular, the segment is generally a region of a weak magnetic field, the segment I-II is generally a region of an increasing magnetic field, the segment II-III is generally a region of a strong magnetic field, the segment III-IV is generally a region of decreasing magnetic field, and the segment IV-I$^+$ is generally a region of a weak magnetic field. FIG. 16 shows an enlarged section of the MCR 100 along an azimuthal path (which may be similar to the path 118 of FIG.

14) including two MCE disks 154a and 154b, and their adjacent heat commutators 160a, 160b, and 160c. The azimuthal positions I, II, III, and IV are shown with respect to the features of the heat commutators 160a, 160b, and 160c.

In operation, the drive shaft 158 together with the MCE disks 154 and disk spacers 172 (FIG. 2) may be rotated by an externally applied torque in the direction identified by arrow 116 (FIG. 1). For example, the drive shaft may 158 may be rotated by an electric motor, hydraulic motor, air motor, an internal combustion engine, a mechanical spring, by hand, or by any other suitable means. Concurrently, the heat commutators 160, the enclosure shell 134, the spacer rings 176, the bearings 138, the end caps 168 and 170, and the magnet flux returns 148 may remain stationary. The relative motion between the MCE disks 154 and the heat commutators 160 may cause the TIF 142 in the gaps 184 (FIGS. 6 and 16) to flow in a regime known as "shear-driven flow" also known as a "Couette flow." Such a flowing condition of the TIF 142 may significantly enhance its heat transferring capability.

Figure 17:
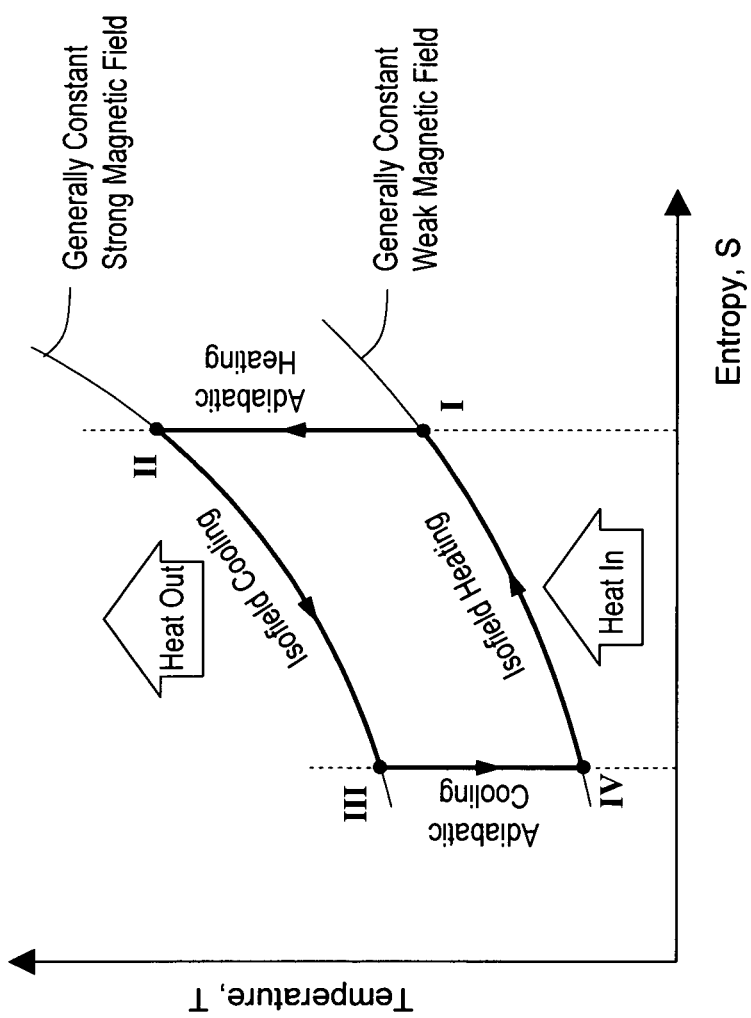
FIG. 17 is a diagram of temperature versus entropy illustrating a thermodynamic cycle of an exemplary portion of one MCE disk of FIG. 16.

Now referring to FIG. 16, rotary motion causes the MCE rings 162a and 162b to move azimuthally in the direction of the arrow 124. Thus an exemplary portion of the MCE rings 162a and 162b may repeatedly pass through the positions IV$^-$, I, II, III, IV, and I$^+$. In particular, an exemplary portion of the MCE ring 162a arriving at the position IV" forms a good thermal communication (via TIF 142 in the gap 184) with the thermally conducting core 164a of the heat commutator 160a. While being in the segment IV$^-$-I (region of substantially constant weak magnetic field), the exemplary portion of the MCE ring 162a may be in its lower temperature state and it may receive heat from the thermally conducting core 164a. In particular, heat flow is indicated by a dotted line and arrow 114. Concurrently, the exemplary portion of the MCE ring 162a is thermally insulated from the heat commutator 160b by the insulating portion 152b. Since most MCE materials may have a limited thermal conductivity (typically around 10 Watts/meter-degrees Kelvin or less), azimuthal conduction of heat in the MCE ring 162a may be rather slow compared to the speed of azimuthal motion indicated by the arrow 124. Hence, the temperature of the exemplary portion of the MCE ring 162a at the position I may be higher than its temperature at the position IV$^-$. The associated thermodynamic process is shown in FIG. 17, which (in an idealized theoretical sense) plots the temperature of the exemplary portion of the MCE ring 162a against its entropy. In particular, the thermodynamic process of the exemplary portion of the MCE ring 162a in the segment IV-I, which is labeled "isofield heating" (because it occurs at a substantially constant magnetic field) includes heat input (from the thermally conducting core 164a) accompanied by the increases in each the temperature and the entropy the exemplary portion.

Referring now back to FIG. 16, the exemplary portion of the MCE ring 162a may now progress to the segment I-II (a region of increasing magnetic field) where it may experience a temperature rise due to the MCE. Concurrently, the exemplary portion of the MCE ring 162a is being thermally insulated from the thermally conducting core 164a by the insulating portion 151a and from the thermally conducting core 164b by the insulating portion 152b. The thermodynamic process of the exemplary portion of the MCE ring 162a in the segment I-II is labeled "adiabatic heating" in FIG. 17 because the heating occurs under substantially thermally insulated conditions. Referring now back to FIG. 16, the exemplary portion of the MCE ring 162a may now progress to the segment II-III (a region of substantially constant strong magnetic field) where it may be in a good thermal communication (via TIF 142 in the gap 184) with the thermally conducting core 164b of the heat commutator 160b while being thermally insulated from the thermally conducting core 164a by the insulating portion 151a. Note, that at least a portion the heat acquired by the exemplary portion of the MCE ring 162a in the segment IV$^-$-I has been substantially transported to the segment II-III by the motion of the MCE ring 162a. Heat transport is indicated by the dotted line 114. A portion of the heat stored in the exemplary portion of the MCE ring 162a may be now transferred via TIF 142 into the thermally conducting core 164b of the heat commutator 160b. The thermodynamic process of the exemplary portion of the MCE ring 162a in the segment II-III is labeled "isofield cooling" because it occurs at a substantially constant (and strong) magnetic field. This process includes heat loss (to the heat commutator 160b) accompanied by decreases in each the temperature and the entropy of the exemplary portion of the MCE ring 162a.

Referring now back to FIG. 16, the exemplary portion of the MCE ring 162a may now progress to the segment III-IV (a region of decreasing magnetic field) where it may experience a temperature decrease due to the MCE. Concurrently, the exemplary portion of the MCE ring 162a is being thermally insulated from thermally conducting core 164a of the heat commutator 160a by the insulating portion 151a, and from thermally conducting core 164b of the heat commutator 160b by the insulating portion 152b. The thermodynamic process of the exemplary portion of the MCE ring 162a in the segment is labeled "adiabatic cooling" in FIG. 17 because the cooling occurs under substantially thermally insulated conditions. As the exemplary portion of the MCE ring 162a arrives at the position IV, its theoretical thermodynamic state may be same as it was at the position IV$^-$, thus completing a closed thermodynamic cycle. Thus the, position IV marks both the end of the above described cycle and the beginning of a new cycle. As the exemplary portion of the MCE ring 162a progresses though the segment Iv-I$^+$, it acquires heat from the thermally conducting core 164a and so on. Because the MCE ring 162a has to pass through four (4) peaks and four (4) valleys in the absolute magnetic field, it will experience four thermodynamic cycles per rotation. Each such a cycle may remove heat from the thermally conducting core 164a of heat commutator 160a and "pump" it to the thermally conducting core 164b of the heat commutator 160b. Thus, the net effect of the rotation of the MCE ring 162a is the removal of heat from the heat commutator 160a and "pumping" it to the heat commutator 160b. Concurrently, a similar process takes place on the MCE ring 162b, namely heat removal from the heat commutator 160b and "pumping" it to the heat commutator 160c. The thermodynamic cycle of the MCE ring 162b may be similar to that shown in FIG. 17, but it may generally occur at an elevated temperature. Each MCE disk 154 (with its MCE ring 162) represents a stage in the MCR 100, which is shown in FIGS. 2 and 3 to have six (6) stages. With additional MCE disks 154 and commutators 160 being added, an MCR with arbitrary number of stages may be constructed to attain a desirable temperature differential. Similarly, the number of peaks and valleys in the absolute magnetic field experienced by the MCE disks 154 in a single rotation may be increased or decreased.

Referring now to FIG. 2, the end cap 170 is arranged to be in a good thermal communication with its adjacent heat commutator, and the end cap 168 is arranged to be in a good thermal communication with its adjacent heat commutator.

Operation of the MCR 100 may cause the end cap 170 to become colder and the end cap 168 to become warmer. The end cap 170 may be placed in a thermal communication with an article or a substance to be cooled, while the end cap 168 may be placed in a thermal communication with a suitable heat sink. The number of MCE disks 154 and heat commutators 160 in the MCR 100 may be set in accordance with a desirable temperature differential between the "hot" end cap 168 and the "cold" end cap 170. The diameter of the MCE disk 154 may be increased to increase the refrigeration power. A larger MCE disk diameter may also make it possible to increase the number of peaks and valleys in the absolute magnetic field experienced by the MCE disks 154 in a single rotation to further increase the refrigeration power. Using stronger magnets may also substantially increase the refrigeration power. Varying the speed of rotation may be also used to vary the refrigeration power, however, excessively slow speed of rotation may increase parasitic losses due to heat conduction in azimuthal direction inside the MCE ring 162, while excessively fast speed of rotation may limit the amount of heat that may be conductively transferred between the interior and the surface of the MCE ring 162. The latter may be due to the already noted rather limited thermal conductivity of the MCE material of the MCE ring 162. Depending on a specific construction, the speed at which the MCR drive shaft 158 may rotate for optimum performance may be in the range of several revolutions per minute (RPM) to several tens (10's) of RPM. As a result, the MCR of the subject invention may generate substantially less acoustic noise in the audible range than a comparable vapor compression cycle refrigerator, which may have a compressor operating at around 1800 RPM.

For example, if the MCR of the subject invention is used in a refrigerator or a freezer application, the "cold" end cap 170 may be placed in a good thermal communication with an inside wall of a refrigerator/freezer and/or with air inside the refrigerator/freezer, while the "hot" end cap 168 may be placed in a good thermal communication with a suitable heat exchanger cooled by ambient air.

As another example, if the MCR of the subject invention is used in an air conditioning application, the "cold" end cap 170 may be placed in a good thermal communication with a heat exchanger thermally contacting the ambient inside (indoors) air, while the "hot" end cap 168 may be placed in a good thermal communication with a suitable heat exchanger cooled by ambient outside air. Alternatively, if the MCR of the subject invention is used in a heat pump application, the "cold" end cap 170 may be placed in a good thermal communication with a heat exchanger thermally contacting the ambient outside air, while the "hot" end cap 168 may be placed in a good thermal communication with a suitable heat exchanger thermally contacting the ambient inside (indoors) air.

As yet another example, if the MCR of the subject invention is used in electronics cooling application, the "cold" end cap 170 may be placed in a good thermal communication with the electronics to be cooled, while the "hot" end cap 168 may be placed in a thermal communication with a suitable heat exchanger cooled by ambient outside air. If the MCR of the subject invention is used to cool electronics on a spacecraft, the "hot" end cap 168 may be placed in a good thermal communication with a suitable heat radiator.

In stationary applications, such as air conditioning of buildings, the drive shaft 158 may be rotated by an electric motor, preferably through a reduction gear box. In mobile applications such as automotive vehicles, the drive shaft 158 may be rotated directly by the propulsion engine or motor. Furthermore, in some vehicular applications the drive shaft 158 may be rotated at least intermittently by mechanical energy recovered during vehicle deceleration. Since the MCR of the subject invention may offer higher efficiency over a conventional vapor compression cycle, it may be advantageously used for cabin air conditioning and comfort heating in electric vehicles and hybrid electric vehicles. Because cabin air conditioning and comfort heating in such vehicles competes with propulsion motors for electric energy for batteries, energy efficient air conditioning and heating is very important.

Figure 18:
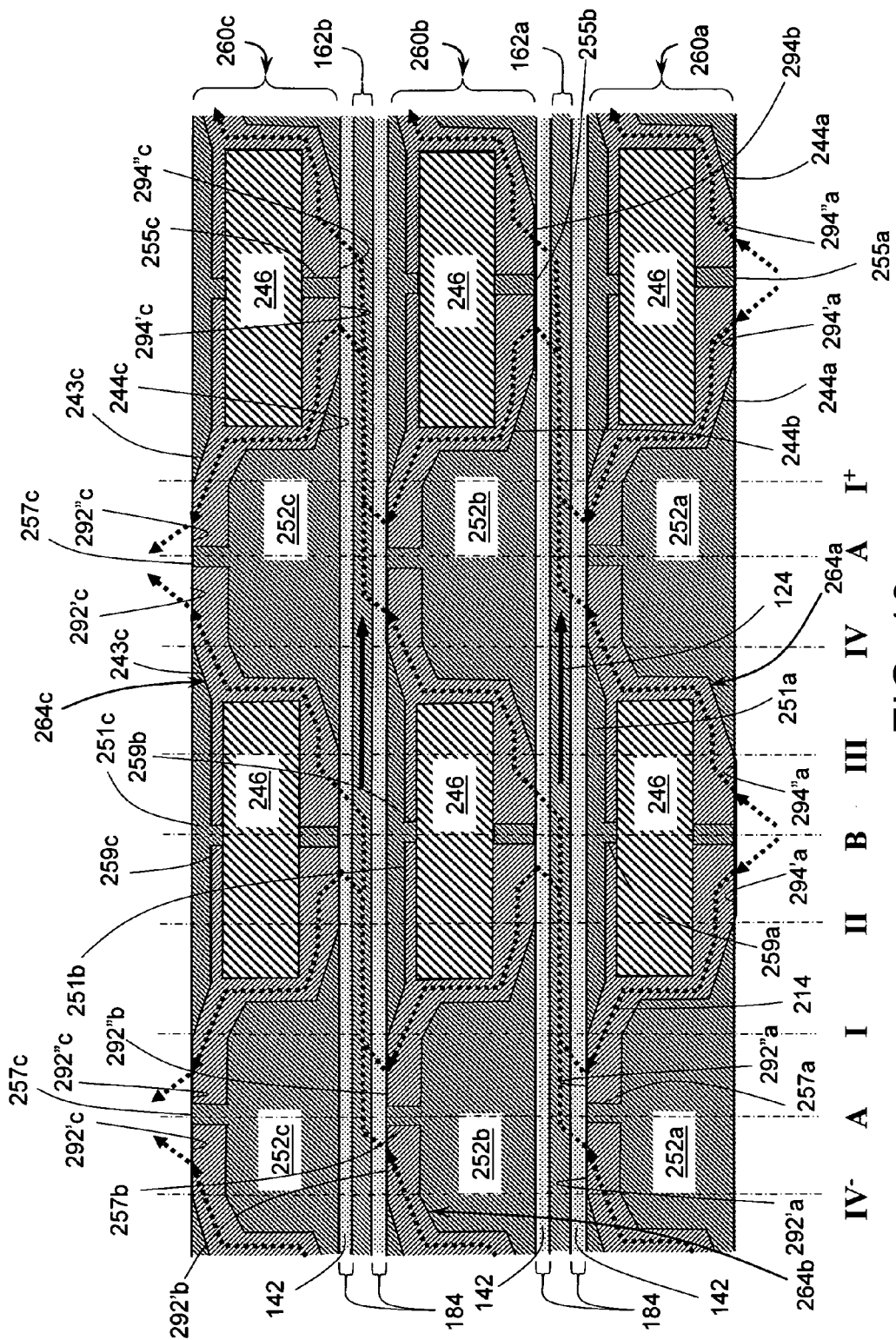
FIG. 18 is a cross-sectional view of a portion of the MCR of FIG. 1 showing alternative heat commutators.

Referring now to FIG. 18, there is shown an azimuthal section (similar to the section shown in FIG. 16) through a portion of an MCR of the subject invention showing an alternative heat commutators 260 having alternative thermally conducting cores 264 divided by insulators 257 at azimuthal position "A" and by insulators 255 and 259 at azimuthal position "B". The alternative thermally conducting core 264 may be formed by radially splitting the heat transfer surfaces 192 and 194 of the thermally conducting core 164 (FIGS. 10A and 10B) into heat transfer surfaces 292' and 292", and 294' and 294" respectively as indicated by heavy broken lines 212 in FIGS. 19A and 19B. In particular, the alternative thermally conducting core 264 may be formed as several separate portions rather than being monolithic.

The alternative thermally conducting core 264 allows for its separate portions to operate at different temperatures. For example, the alternative thermally conducting core 264 allows for a dedicated thermal communication between the portion of the MCE ring 162a in the segment II-B with the portion of the MCE ring 162b in the segment A-I without being in a direct thermal communication via the thermally conducting core material with the portion of the MCE ring 162a in the segment B-III. As another example, the alternative thermally conducting core 264 allows, for a dedicated thermal communication between the portion of the MCE ring 162a in the segment B-III with the portion of the MCE ring 162b in the segment IV-A without being in a direct thermal communication via the thermally conducting core material with the portion of the MCE ring 162b in the segment A-I$^+$.

The preferential path for transporting the heat in the MCR of the subject invention are shown as dotted lines and arrows 214 in FIG. 18. Whereas a monolithic thermally conducting core 164 is substantially isothermal during the operation of the MCR of the subject invention, portions the alternative thermally conducting core 264 may operate at temperatures different from each other. The permanent magnets 246 may be thermally insulated from portions of the thermally conducting core 264. MCR of the subject invention using alternative thermally conducting core 264 may have a significant performance advantage over the MCR of the subject invention using a monolithic thermally conducting core 164.

It has been noted above that heat conduction within the MCE ring 162 in the azimuthal direction may be undesirable as it may reduce the efficiency of the MCR 100. FIG. 20A shows an alternative MCE ring 362 having radial slots 369 for restricting parasitic flow of heat in azimuthal direction. The slots 369 may be empty or filled with a suitable thermally insulating material. FIG. 20B is a cross-sectional view of the MCE ring 362 showing that the slots 369 may penetrate through the full thickness of the MCE ring material. An alternative slots (not shown) may not be necessarily radial and/or may not necessarily penetrate through the full thickness of the MCE ring material.

It has been noted above that MCE materials may have only a limited thermal conductivity in the range of about 10 Watts/meter-degree Kelvin and often lower. This makes it challenging to conduct heat to and from the interior of the MCE ring 162. FIG. 21A shows another alternative MCE ring 462 having portions 461 made of suitable MCE material and portions 489 (FIGS. 21B and 21C) made of material having high thermal conductivity. For example, portions 489 may be made of copper, silver, aluminum, graphite, graphite fiber, graphene, or other suitable material. The transverse dimension "X" of portions 489 is preferably made comparable to or smaller than the thickness "T" of the MCE ring 462. Portions 489 may be formed as a cylinder, prism, parallel-piped, cones, or pyramids, or other suitable shapes. Portions 489 may enhance the conductive heat transfer between the interior of the MCE material of the MCE ring 462 and the flat surfaces of the MCE ring 462, thus mitigating the limited thermal conductivity of typical MCE materials. This may beneficially allow for a substantial increase of the thickness "T" of the MCE ring 462, and/or substantial increase of the speed of rotation of the MCE ring 462. In either case, an increased refrigeration power may be obtained.

The above description of the embodiments of the present invention are merely exemplary in nature and are in no way intended to limit the invention, its application, or uses. For example, other embodiments of the invention may use linearly moving strips or plates of MCE material rather than rotating rings. Suitable linear motion may be continuous or reciprocating. As another example, yet other embodiments of the invention may use electromagnets or superconducting magnets instead (or in a combination with) permanent magnets.

Apart for refrigeration and/or pumping heat, the MCR apparatus of the subject invention may be also used to convert thermal energy into mechanical energy. Referring now to FIG. 2, the end cap 170 may be thermally connected to a suitable source of heat at a first temperature and the end cap 168 may be thermally connected to a suitable heat sink at a temperature substantially lower than the first temperature. Heat may flow through the MCR 100 from the end cap 170 to the end cap 168 in a similar way as already described. Azimuthal temperature variations in the MCE rings 162 may cause corresponding variations in the magnetization of the MCE material within the MCE rings 162. In particular, cooler portions of the MCE material may be magnetized more and may be drawn more into the space between the magnets 146, which may produce a torque on the MCE ring 162, causing it to rotate the shaft 158. MCR apparatus of the subject invention may be also used to convert low-level heat into mechanical energy, which may make it useful for energy recovery from waste heat generated by some combustion processes. Alternatively, the MCR apparatus of the subject invention may be used to convert solar heat to a mechanical energy. In particular, the shaft 158 may be coupled to an electric generator or a pump.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," and "includes" and/or "including" when used in this specification, specify the presence of stated features, integers, steps, operations, elements, and/or components, but do not preclude the presence or addition of one or more other features, integers, steps, operations, elements, components, and/or groups thereof.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

The term "suitable," as used herein, means having characteristics that are sufficient to produce a desired result. Suitability for the intended purpose can be determined by one of ordinary skill in the art using only routine experimentation.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

Different aspects of the invention may be combined in any suitable way.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. A magneto-caloric refrigerator (MCR) comprising: at least one magnetic caloric effect (MCE) disk, a plurality of heat commutators, and a thermal interface fluid (TIF);
   a) said MCE disk comprising an MCE ring made of suitable MCE material and formed as an annular disk;
   b) said heat commutators each being formed as an annular disk;
   c) said heat commutators arranged substantially equally spaced on a common axis;
   d) said MCE disks arranged to interspace said heat commutators,
   e) said MCE disks arranged to rotate about their axis of rotational symmetry and with respect to said commutators;
   f) each said MCE ring being separated from adjacent heat commutator by an axial gap;
   g) said TIF arranged to substantially fill said axial gap;
   h) each said commutator comprising a thermally conducting core, a thermally insulating portion, and a permanent magnet; and
   i) said permanent magnet arranged so that a rotation of said MCE ring cyclically exposes said MCE material to a sequence of (i) relatively low magnetic field, (ii) increasing magnetic field, (iii) strong magnetic field, and (iv) decreasing magnetic field.

2. The MCR of claim 1, wherein a portion of said MCE material is arranged to be substantially thermally insulated from said thermally conductive core when said portion of said MCE material is exposed to said increasing magnetic field or to said decreasing magnetic field.

3. The MCR of claim 1, wherein a portion of said MCE material is arranged to be in good thermal communication with said thermally conductive core when said portion of said MCE material is exposed to said weak magnetic field or to said strong magnetic field.

4. The MCR of claim 3, wherein said good thermal communication comprises a flow of heat via said TIF.

5. The MCR of claim 1, wherein said thermally conductive core and said thermally insulating portion are arranged so that said rotation of said MCE disk cyclically exposes said MCE ring material to a sequence of (i) good thermal communication with said thermally conductive core and (ii) substantial thermal insulation from said thermally conductive core.

6. The MCR of claim 1, wherein said MCE ring interspaces a first heat commutator and a second hear commutator; said first heat commutator comprises a first thermally conducting core and a first thermally insulating portion; said second heat commutator comprises a second thermally conducting core and a second thermally insulating portion; said first thermally conductive core, said first thermally insulating portion, said second thermally conductive core, and said second thermally insulating portion of said being arranged so that the quality of thermal communication of a portion of said MCE material with said first heat commutator and with said second heat commutator can be only selected from the group consisting of (i) good thermal communication with said first thermally conductive core, (ii) good thermal communication with said second thermally conductive core, and (iii) substantially thermally insulated from said first thermally conducting core and from said second thermally conducting core.

7. The MCR of claim 6, wherein said that the quality of thermal communication of said portion of said MCE material with said first heat commutator and said second heat commutator can be selected from said group only on exclusive basis.

8. The MCR of claim 1, wherein said MCE ring interspaces a first heat commutator and a second heat commutator; and each said heat commutator comprises a thermally conducting core and a thermally insulating portion.

9. The MCR of claim 8, wherein said thermally conducting cores and said thermally insulating portions are arranged so that said MCE material is in a good thermal communication with said thermally conducting core of said first commutator when said MCE material is exposed to said weak magnetic field.

10. The MCR of claim 8, wherein said thermally conducting cores and said thermally insulating portions are arranged so that said MCE material is in a good thermal communication with said thermally conducting core of said second commutator when said MCE material is exposed to said strong magnetic field.

11. The MCR of claim 8, wherein said thermally conducting cores and said thermally insulating portions are arranged so that said MCE material is substantially thermally insulated from said thermally conducting cores when said MCE material is exposed to magnetic field selected from the group consisting of substantially increasing magnetic field and substantially decreasing magnetic field.

* * * * *